US012625825B2

(12) United States Patent
Beecroft et al.

(10) Patent No.: US 12,625,825 B2
(45) Date of Patent: May 12, 2026

(54) SYSTEMS AND METHODS FOR ON THE FLY ROUTING IN THE PRESENCE OF ERRORS

(71) Applicant: Hewlett Packard Enterprise Development LP, Spring, TX (US)

(72) Inventors: Jonathan P. Beecroft, Bristol (GB); Edwin L. Froese, Burnaby (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/675,551

(22) Filed: May 28, 2024

(65) Prior Publication Data

US 2024/0314063 A1 Sep. 19, 2024

Related U.S. Application Data

(63) Continuation of application No. 17/594,712, filed as application No. PCT/US2020/024342 on Mar. 23, 2020, now Pat. No. 12,003,411.

(Continued)

(51) Int. Cl.
 *G06F 13/16* (2006.01)
 *G06F 9/50* (2006.01)
(Continued)

(52) U.S. Cl.
 CPC .......... *G06F 13/1642* (2013.01); *G06F 9/505* (2013.01); *G06F 9/546* (2013.01); *G06F 12/0862* (2013.01); *G06F 12/1036* (2013.01); *G06F 12/1063* (2013.01); *G06F 13/14*

(2013.01); *G06F 13/16* (2013.01); *G06F 13/1673* (2013.01); *G06F 13/28* (2013.01); *G06F 13/385* (2013.01); *G06F 13/4022* (2013.01); *G06F 13/4068* (2013.01);
(Continued)

(58) Field of Classification Search
 CPC ...................................................... H04L 45/28
 See application file for complete search history.

(56) References Cited

U.S. PATENT DOCUMENTS 6,697,329 B1 * 2/2004 McAllister .......... H04L 43/0811
 370/235
7,382,787 B1 * 6/2008 Barnes .................... H04L 12/66
 370/473
(Continued)

*Primary Examiner* — Guang W Li
(74) *Attorney, Agent, or Firm* — Dickinson Wright

(57) ABSTRACT

Systems and methods are provided for "on the fly" routing of data transmissions in the presence of errors. Switches can establish flow channels corresponding to flows in the network. In response to encountering a critical error on a network link along a transmission path, a switch can generate an error acknowledgement. The switch can transmit the error acknowledgements to ingress ports upstream from the network link via the plurality of flow channels. By transmitting the error acknowledgement, it indicates that the network link where the critical error was encountered is a failed link to ingress ports upstream from the failed link. Subsequently, each ingress port upstream from the failed link can dynamically update the path of the plurality of flows that are upstream from the failed link such that the plurality of flows that are upstream from the failed link are routed in a manner that avoids the failed link.

20 Claims, 9 Drawing Sheets

Related U.S. Application Data

(60) Provisional application No. 62/852,273, filed on May 23, 2019, provisional application No. 62/852,203, filed on May 23, 2019, provisional application No. 62/852,289, filed on May 23, 2019.

(51) Int. Cl.

| | |
|---|---|
| *G06F 9/54* | (2006.01) |
| *G06F 12/0862* | (2016.01) |
| *G06F 12/1036* | (2016.01) |
| *G06F 12/1045* | (2016.01) |
| *G06F 13/14* | (2006.01) |
| *G06F 13/28* | (2006.01) |
| *G06F 13/38* | (2006.01) |
| *G06F 13/40* | (2006.01) |
| *G06F 13/42* | (2006.01) |
| *G06F 15/173* | (2006.01) |
| *H04L 1/00* | (2006.01) |
| *H04L 43/0876* | (2022.01) |
| *H04L 43/10* | (2022.01) |
| *H04L 45/00* | (2022.01) |
| *H04L 45/02* | (2022.01) |
| *H04L 45/021* | (2022.01) |
| *H04L 45/028* | (2022.01) |
| *H04L 45/12* | (2022.01) |
| *H04L 45/122* | (2022.01) |
| *H04L 45/125* | (2022.01) |
| *H04L 45/16* | (2022.01) |
| *H04L 45/24* | (2022.01) |
| *H04L 45/42* | (2022.01) |
| *H04L 45/745* | (2022.01) |
| *H04L 47/10* | (2022.01) |
| *H04L 47/11* | (2022.01) |
| *H04L 47/12* | (2022.01) |
| *H04L 47/122* | (2022.01) |
| *H04L 47/20* | (2022.01) |
| *H04L 47/22* | (2022.01) |
| *H04L 47/24* | (2022.01) |
| *H04L 47/2441* | (2022.01) |
| *H04L 47/2466* | (2022.01) |
| *H04L 47/2483* | (2022.01) |
| *H04L 47/30* | (2022.01) |
| *H04L 47/32* | (2022.01) |
| *H04L 47/34* | (2022.01) |
| *H04L 47/52* | (2022.01) |
| *H04L 47/62* | (2022.01) |
| *H04L 47/625* | (2022.01) |
| *H04L 47/6275* | (2022.01) |
| *H04L 47/629* | (2022.01) |
| *H04L 47/76* | (2022.01) |
| *H04L 47/762* | (2022.01) |
| *H04L 47/78* | (2022.01) |
| *H04L 47/80* | (2022.01) |
| *H04L 49/00* | (2022.01) |
| *H04L 49/101* | (2022.01) |
| *H04L 49/15* | (2022.01) |
| *H04L 49/90* | (2022.01) |
| *H04L 49/9005* | (2022.01) |
| *H04L 49/9047* | (2022.01) |
| *H04L 67/1097* | (2022.01) |
| *H04L 69/22* | (2022.01) |
| *H04L 69/40* | (2022.01) |
| *H04L 45/28* | (2022.01) |
| *H04L 45/7453* | (2022.01) |
| *H04L 69/28* | (2022.01) |

(52) U.S. Cl.
CPC .... *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 13/1689* (2013.01); *G06F 2212/50* (2013.01); *G06F 2213/0026* (2013.01); *G06F 2213/3808* (2013.01); *H04L 45/28* (2013.01); *H04L 45/7453* (2013.01); *H04L 69/28* (2013.01)

(56) References Cited

U.S. PATENT DOCUMENTS

| | | | | |
|---|---|---|---|---|
| 9,660,866 B1 * | 5/2017 | Singh | | H04L 45/50 |
| 10,200,264 B2 * | 2/2019 | Menon | | H04L 43/0829 |
| 10,320,659 B2 * | 6/2019 | Wetterwald | | H04L 45/34 |
| 10,965,586 B2 * | 3/2021 | Goel | | H04L 45/028 |
| 12,167,353 B2 * | 12/2024 | Cao | | H04J 3/0667 |
| 2002/0181485 A1 * | 12/2002 | Cao | | H04Q 11/04 |
| | | | | 370/389 |
| 2011/0096660 A1 * | 4/2011 | Ikeda | | H04W 36/36 |
| | | | | 370/225 |
| 2015/0023325 A1 * | 1/2015 | Wetterwald | | H04L 5/0055 |
| | | | | 370/336 |
| 2015/0023328 A1 * | 1/2015 | Thubert | | H04W 72/0446 |
| | | | | 370/336 |
| 2015/0256654 A1 * | 9/2015 | Oguchi | | G06F 11/1451 |
| | | | | 709/230 |
| 2016/0294694 A1 * | 10/2016 | Parker | | H04L 45/10 |
| 2018/0287928 A1 * | 10/2018 | Levi | | H04L 45/16 |
| 2019/0104206 A1 * | 4/2019 | Goel | | H04L 45/42 |
| 2020/0067637 A1 * | 2/2020 | Wang | | H04L 45/08 |
| 2024/0314063 A1 * | 9/2024 | Beecroft | | H04L 45/7453 |

* cited by examiner

800

800

| PROCESSOR(S) | | NETWORK INTERFACE(S) |
| 804 | | 818 |

BUS
802

| MAIN MEMORY | ROM | STORAGE |
| 806 | 808 | 810 |

| DISPLAY | INPUT DEVICE(S) | CURSOR CONTROL |
| 812 | 814 | 816 |

SYSTEMS AND METHODS FOR ON THE FLY ROUTING IN THE PRESENCE OF ERRORS

CROSS REFERENCE TO RELATED APPLICATIONS

This application is a continuation of U.S. patent application Ser. No. 17/594,712, filed on Oct. 27, 2021, which application is a national stage of International Application No. PCT/US2020/024342, filed on Mar. 23, 2020, which claims the benefit of U.S. Provisional Application No. 62/852,203 filed on May 23, 2019, U.S. Provisional Application No. 62/852,273 filed on May 23, 2019 and U.S. Provisional Application No. 62/852,889. The disclosures of the aforementioned applications are hereby incorporated by reference in their entireties.

STATEMENT OF GOVERNMENT RIGHTS

The invention(s) described herein were made with U.S. Government support under one or more of the contracts set forth below. The U.S. Government has certain rights in these inventions.

| Contract Title | Customer/Agency | Contract Reference |
|---|---|---|
| FastForward-2 | Lawrence Livermore National Security, LLC/Dept of Energy | Subcontract B609229 under prime contract DE-AC52-07NA27344 |
| BeePresent | Maryland Procurement Office | H98230-15-D-0020; Delivery Order 003 |
| SeaBiscuit | Maryland Procurement Office | H98230-14-C-0758 |
| PathForward | Lawrence Livermore National Security, LLC/Dept of Energy | Subcontract B620872 under prime contract DE-AC52-07NA27344 |
| DesignForward | The Regents of the University of California/ Dept of Energy | Subcontract 7078453 under prime contract DE-AC02-05CII11231 |
| DesignForward-2 | The Regents of the University of California/ Dept of Energy | Subcontract 7216357 under prime contract DE-AC02-05CII11231 |

DESCRIPTION OF RELATED ART

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
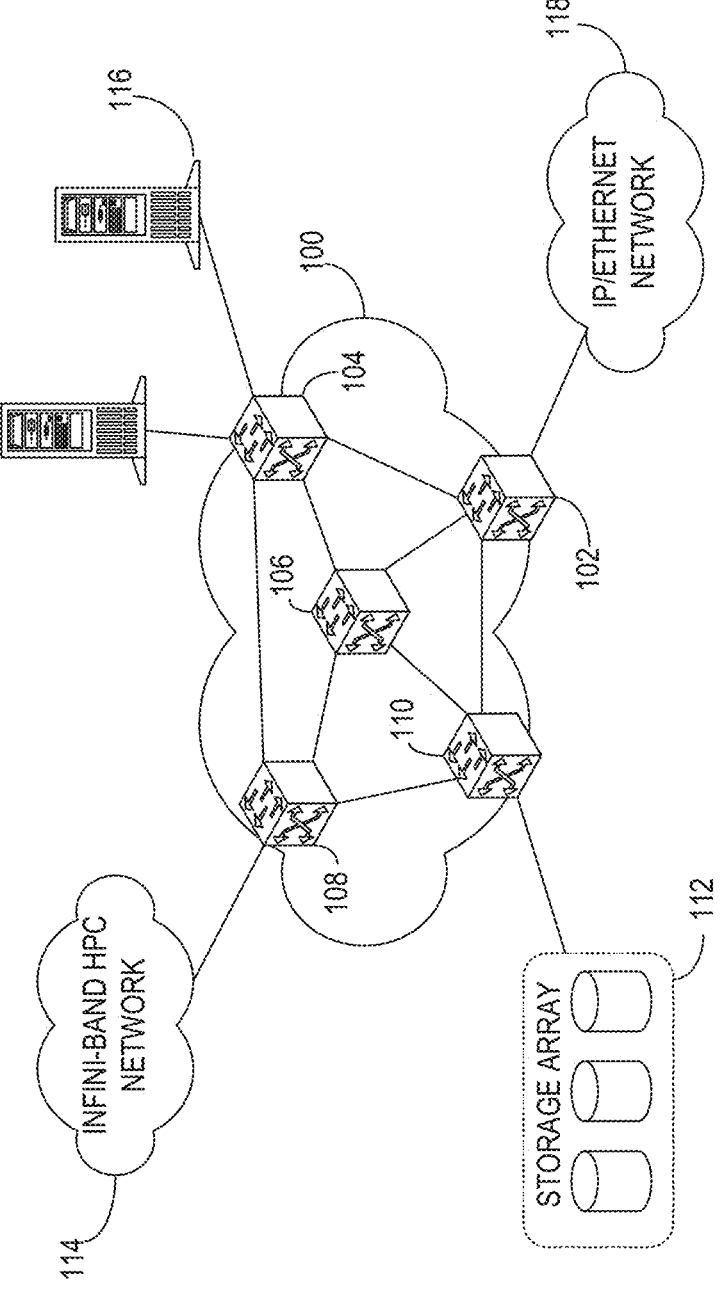
FIG. 1 illustrates an example network in which various embodiments may be implemented.

The figures are not exhaustive and do not limit the present disclosure to the precise form disclosed.

DETAILED DESCRIPTION

The present disclosure describes systems and methods that can accommodate exascale computing, e.g., perform data-intensive tasks such as simulations, data analytics, artificial intelligence workloads at exascale speeds. In particular, an High Performance Computing (HPC) network or interconnect fabric is provided that may be Ethernet-compatible, able to connect to third-party data storage, and can be built using a switch component that is extremely high bandwidth, e.g., on the order to 12.8 Tb/s/dir per switch with, e.g., 64 200 Gbps ports that support large network creation with very low diameter (e.g., only three network hops).

A switch chip is used to implement the aforementioned switch. The switch chip is a custom Application Specific Integrated Circuit (ASIC) designed for the network. As an example, it can provides 64 network ports that can operate at either 100 Gbps or 200 Gbps for an aggregate throughput of 12.8 Tbps. Each network edge port is able to support IEEE 802.3 Ethernet, and Optimized-IP based protocols as well as Portals, an enhanced frame format that provides support for higher rates of small messages. Ethernet frames can be bridged based on their L2 address or they can be routed based on their L3 (1Pv4//1Pv6) address. Optimized-IP frames only have an L3 (1Pv4/1Pv6) header, so must always be routed. The enhanced Portals format frames require specialized NIC support and can map directly onto the Switch enhanced fabric format.

When the switch chip is connected to another switch chip, they can communicate using an enhanced fabric frame format, which provides additional control and status fields to support a multi-chip fabric. A differentiating feature of the switch chip, when compared to commodity Ethernet switch ASICs or alternative technologies such as InfiniBand, is that it has a novel congestion control mechanism called Flow Channels. One of the purposes of the enhanced fabric frame format that operates between Switch ASICs is to provide forward and reverse path signaling of state for the congestion control Flow Channels. By leveraging flow channels, the disclosed switches achieve enhanced control mechanisms, such as "on the fly" routing, adaptive routing, and unique traffic classes that allow for flexibility in terms of bandwidth shaping, priority, and routing policy.

Within the switch chip, network traffic can be managed to potentially avoid failing links. Nonetheless, typical approaches for managing the network traffic does not completely prevent use of failing links when no alternative path exists to a certain destination. Generally, failing link avoidance can be accomplished in two parts: 1) the switch provides a measure of the rate and type of errors; and 2) accommodates rerouting to avoid the failing link (e.g. it can make the failing link appear heavily loaded so that adaptive routing will prefer an alternative path). In practice, an error acknowledgement can be generated and transmitted upstream which accommodates an "on the fly" routing in a manner to avoid the error. In a separate part to the switch chip, a flow of frames heading into a completely broken link will be rerouted onto an alternative path in a way that prevents reordering, and from every switch that is upstream of the failing link.

FIG. 1 shows an example network 100 comprising a plurality of switches, which can also be referred to as a "switch fabric." As illustrated in FIG. 1, network 100 can include switches 102, 104, 106, 108, and 110. Each switch can have a unique address or identifier (ID) within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. For example, a switch, such as switch 102 may receive 802.3 frames (including the encapsulated IP payload) by way of Ethernet devices, such as network interface cards (NICs), switches, routers, or gateways. IPv4 or IPv6 packets, frames formatted specifically for network 100, etc. may also be received, transported through the switch fabric 100, to another switch, e.g., switch 110. Thus, network 100 is capable of handling multiple types of traffic simultaneously. In general, a switch can have edge ports and fabric ports. An edge port can couple to a device that is external to the fabric. A fabric port can couple to another switch within the fabric via a fabric link.

Typically, traffic can be injected into switch fabric 100 via an ingress port of an edge switch, and leave switch fabric 100 via an egress port of another (or the same) edge switch. An ingress edge switch can group injected data packets into flows, which can be identified by flow ID's. The concept of a flow is not limited to a particular protocol or layer (such as layer-2 or layer-3 in the Open System Interface (OSI) reference model). For example, a flow can be mapped to traffic with a particular source Ethernet address, traffic between a source IP address and destination IP address, traffic corresponding to a TCP or UDP port/IP 5-tuple (source and destination IP addresses, source and destination TCP or UDP port numbers, and IP protocol number), or traffic produced by a process or thread running on an end host. In other words, a flow can be configured to map to data between any physical or logic entities. The configuration of this mapping can be done remotely or locally at the ingress edge switch.

Upon receiving injected data packets, the ingress edge switch can assign a flow ID to the flow. This flow ID can be included in a special header, which the ingress edge switch can use to encapsulate the injected packets. Furthermore, the ingress edge switch can also inspect the original header fields of an injected packet to determine the appropriate egress edge switch's address, and include this address as a destination address in the encapsulation header. Note that the flow ID can be a locally significant value specific to a link, and this value can be unique only to a particular input port on a switch. When the packet is forwarded to the next-hop switch, the packet enters another link, and the flow-ID can be updated accordingly. As the packets of a flow traverses multiple links and switches, the flow IDs corresponding to this flow can form a unique chain. That is, at every switch, before a packet leaves the switch, the packet's flow ID can be updated to a flow ID used by the outgoing link. This up-stream-to-down-stream one-to-one mapping between flow ID's can begin at the ingress edge switch and end at the egress edge switch. Because the flow ID's only need to be unique within an incoming link, a switch can accommodate a large number of flows. For example, if a flow ID is 11 bits long, an input port can support up to 2048 flows. Furthermore, the match pattern (one or more header fields of a packet) used to map to a flow can include a greater number of bits. For instance, a 32-bit long match pattern, which can include multiple fields in a packet header, can map up $2^{32}$ different header field patterns. If a fabric has N ingress edge ports, a total number of $N*2^{32}$ identifiable flows can be supported.

A switch can assign every flow a separate, dedicated input queue. This configuration allows the switch to monitor and manage the level of congestion of individual flows, and prevent head-of-queue blocking which could occur if shared buffer were used for multiple flows. When a packet is delivered to the destination egress switch, the egress switch can generate and send back an acknowledgement (ACK) in the upstream direction along the same data path to the ingress edge switch. As this ACK packet traverses the same data path, the switches along the path can obtain the state information associated with the delivery of the corresponding flow by monitoring the amount of outstanding, unacknowledged data. This state information can then be used to perform flow-specific traffic management to ensure the health of the entire network and fair treatment of the flows. As explained in more detail below, this per-flow queuing, combined with flow-specific delivery acknowledgements, can allow the switch fabric to implement effective, fast, and accurate congestion control. In turn, the switch fabric can deliver traffic with significantly improved network utilization without suffering from congestion.

Flows can be set up and released dynamically, or "on the fly," based on demand. Specifically, a flow can be set up (e.g., the flow-ID to packet header mapping is established) by an ingress edge switch when a data packet arrives at the switch and no flow ID has been previously assigned to this packet. As this packet travels through the network, flow IDs can be assigned along every switch the packet traverses, and a chain of flow IDs can be established from ingress to egress. Subsequent packets belonging to the same flow can use the same flow IDs along the data path. When packets are delivered to the destination egress switch and ACK packets are received by the switches along the data path, each switch can update its state information with respect to the amount of outstanding, unacknowledged data for this flow. When a switch's input queue for this flow is empty and there is no more unacknowledged data, the switch can release the flow ID (i.e., release this flow channel) and re-use the flow-ID for other flows. This data-driven dynamic flow setup and tear-down mechanism can obviate the need for centralized flow management, and allows the network to respond quickly to traffic pattern changes.

Note that the network architecture described herein is different from software-defined networks (SDN's), which typically uses the OpenFlow protocol. In SDN, switches are configured by a central network controller, and packets are forwarded based one or more fields in the layer-2 (data link layer, such as Ethernet), layer-3 (network layer, such as IP), or layer-4 (transport layer, such as TCP or UDP) headers. In SDN such header-field lookup is performed at every switch in the network, and there is no fast flow ID-based forwarding as is done in the networks described herein. Furthermore, because the OpenFlow header-field lookup is done using ternary content-addressable memory (TCAM), the cost of such lookups can be high. Also, because the header-field mapping configuration is done by the central controller, the setup and tear-down of each mapping relationship is relatively slow and could require a fair amount of control traffic. As a result, an SDN network's response to various network situations, such as congestion, can be slow. In contrast, in the network described herein, the flows can be set up and torn down dynamically based on traffic demand; and packets can be forwarded by a fixed-length flow ID. In other words, flow channels can be data driven and managed (i.e., set up, monitored, and torn down) in a distributed manner, without the intervention of a central controller. Furthermore, the flow ID-based forwarding can reduce the amount of TCAM space used and as a result a much greater number of flows can be accommodated.

Referring to the example shown in FIG. 1, suppose that storage array 112 is to send data using TCP/IP to host 116. During operation, storage array 112 can send the first packet with host 116's IP address as the destination address and a predetermined TCP port specified in the TCP header. When this packet reaches switch 110, the packet processor at the input port of switch 110 can identify a TCP/IP 5-tuple of this packet. The packet processor of switch 110 can also determine that this 5-tuple currently is not mapped to any flow ID, and can allocate a new flow ID to this 5-tuple. Furthermore, switch 110 can determine the egress switch, which is switch 104, for this packet based on the destination (i.e., host 116's) IP address (assuming switch 110 has knowledge that host 116 is coupled to switch 104). Subsequently, switch 110 can encapsulate the received packet with a fabric header that indicates the newly assigned flow ID and switch 104's fabric address. Switch 110 can then schedule the encapsulated packet to be forwarded toward switch 104 based on a fabric forwarding table, which can be computed by all the switches in fabric 100 using a routing algorithm such as link state or distance vector.

Note that the operations described above can be performed substantially at line speed with little buffering and delay when the first packet is received. After the first packet is processed and scheduled for transmission, subsequent packets from the same flow can be processed by switch 110 even faster because the same flow ID is used. In addition, the design of the flow channels can be such that the allocation, matching, and deallocation of flow channels can have substantially the same cost. For example, a conditional allocation of a flow channel based on a lookup match and a separate, independent deallocation of another flow channel can be performed concurrently in nearly every clock cycle. This means that generating and controlling the flow channels can add nearly no additional overhead to the regular forwarding of packets. The congestion control mechanism, on the other hand, can improve the performance of some applications by more than three orders of magnitude.

At each switch along the data path (which includes switches 110, 106, and 104), a dedicated input buffer can be provided for this flow, and the amount of transmitted but unacknowledged data can be tracked. When the first packet reaches switch 104, switch 104 can determine that the destination fabric address in the packet's fabric header matches its own address. In response, switch 104 can decapsulate the packet from the fabric header, and forward the decapsulated packet to host 116. Furthermore, switch 104 can generate an ACK packet and send this ACK packet back to switch 110. As this ACK packet traverses the same data path, switches 106 and 110 can each update their own state information for the unacknowledged data for this flow.

In general, congestion within a network can cause the network buffers to fill. When a network buffer is full, the traffic trying to pass through the buffer ideally should be slowed down or stopped. Otherwise, the buffer could overflow and packets could be dropped. In conventional networks, congestion control is typically done end-to-end at the edge. The core of the network is assumed to function only as "dumb pipes," the main purpose of which is to forward traffic. Such network design often suffers from slow responses to congestions, because congestion information often cannot be sent to the edge devices quickly, and the resulting action taken by the edge devices cannot always be effective in removing the congestion. This slow response in turn limits the utilization of the network, because to keep the network free of congestion the network operator often needs to limit the total amount of traffic injected into the network. Furthermore, end-to-end congestion control usually is only effective provided that the network is not already congested. Once the network is heavily congested, end-to-end congestion control would not work, because the congestion notification messages can be congested themselves (unless a separate control-plane network that is different from the data-plane network is used for sending congestion control messages).

In contrast, the flow channels can prevent such congestion from growing within the switch fabric. The flow channel mechanism can recognize when a flow is experiencing some degree of congestion, and in response can slow down or stop new packets of the same flow from entering the fabric. In turn, these new packets can be buffered in a flow channel queue on the edge port and are only allowed into the fabric when packets for the same flow leave the fabric at the destination edge port. This process can limit the total buffering requirements of this flow within the fabric to an amount that would not cause the fabric buffers to become too full.

With flow channels, the switches have a reasonably accurate state information on the amount of outstanding in-transit data within the fabric. This state information can be aggregated for all the flows on an ingress edge port. This means that the total amount of data injected by an ingress edge port can be known. Consequently, the flow channel mechanism can set a limit on the total amount of data in the fabric. When all edge ports apply this limit action, the total amount of packet data in the entire fabric can be well controlled, which in turn can prevent the entire fabric from being saturated. The flow channels can also slow the progress of an individual congested flow within the fabric without slowing down other flows. This feature can keep packets away from a congestion hot spot while preventing buffers from becoming full and ensuring free buffer space for unrelated traffic.

Operation of Flow Channel

In general, flow channels can define a path for each communication session across the switch fabric. The path and amount of data belonging to each flow can be described in a set of dynamically connecting flow tables associated with each link of the switch fabric. On every ingress port, edge and fabric, a set of flow channel queues can be defined.

There can be one queue for each flow channel. As packets arrive, they either can be assigned to a flow channel on an edge port, or have been assigned to a flow channel by the link partner's egress fabric port on a fabric ingress port. The flow channel information can be used to direct the packets into the appropriate flow channel queue.

Figures 2A, 2B:
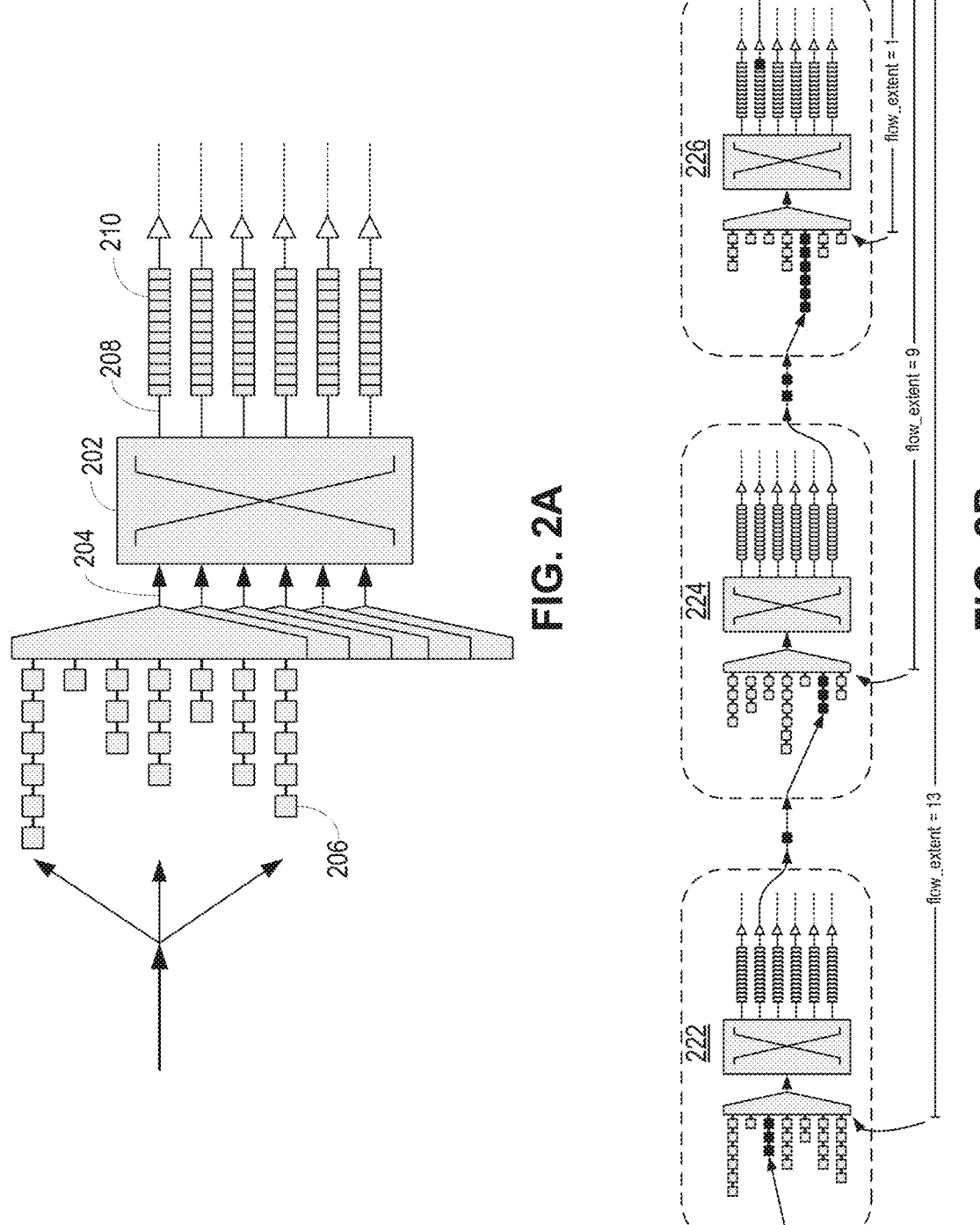
FIG. 2A illustrates an example switch that facilitates flow channels.
FIG. 2B illustrates an example of how switches along a data path can maintain flow state information.

FIG. 2A shows an exemplary switch that facilitates flow channels. In this example, the switch can include a crossbar switch 202. Crossbar switch 202 can have a number of input ports, such as input port 204, and a number of output ports, such as output 208. Crossbar switch 202 can forward packets from an input port to an output port. Each input port can be associated with a number of input queues, each assigned to a different incoming flow arriving on that input port. For example, data arriving on a given port of the switch can first be separated, based on their individual flows, and stored in flow-specific input queues, such as input queue 206. The packets stored in the input queues can be dequeued and sent to crossbar switch 202 based on scheduling algorithms designed to control congestions (described in more detail in later sections). On the output side, once a packet passes crossbar switch 202, it can be temporarily stored in an output transmission queue, such as output transmission queue 210, which can be shared by all the flows leaving on the same output port. Meanwhile, before a packet is dequeued from the output transmission queue and transmitted on the outgoing link, the packet's header can be updated with the flow ID for the outgoing link. Note that this hop-by-hop flow ID mapping can be done when the first packet in the flow travels across the network. When the packet reaches the next-hop switch, the packet can be stored again in a flow-specific input queue and the same process can be repeated. Note that a flow ID is used to distinguish between flows traveling on the same fabric link, and can be typically assigned by the transmitter end of this link, which is the output port of the switch that is transmitting onto this link.

By providing flow-specific input queues, the switch can allow each flow to move independently of all other flows. The switch can avoid the head-of-queue blocking problem, which is common with shared input buffers. The flow-specific input queue also allows the packets within a single flow to be kept in order. When a flow passes through the switches, a flow-specific input queue on each input port can be allocated for this flow and these input queues become linked, effectively forming one long queue that reaches across the entire fabric for this flow, and the packets of this flow can be kept in order.

The progress of successful delivery of packets belonging to a flow can be reported by a sequence of ACKs generated by the edge port of an egress switch. The ACK packets can travel in the reverse direction along the data path traversed by the data packets and can be forwarded by the switches according to the forwarding information maintained in flow tables. As ACK packets travel upstream, they can be processed by each switch's input queue manager, which can update the corresponding flow's state information based on information carried by the ACK packets. The ACK packets can have a type field to provide advanced information about the downstream data path, such as congestions. A switch's input queue manager can use this information to make decisions, such as throttling the transmission rate or changing the forwarding path, about the pending data packets currently buffered in its input queues. In addition, the input queue manager can update the information carried in an ACK packet based on state information of a buffered flow, so that the upstream switches can make proper decisions. For example, if an input queue for a given flow is experiencing congestion (e.g., the amount of data in the queue is above a predetermined threshold), the input queue manager can update an ACK packet that is being forwarded to the next upstream switch to include this congestion information.

If an ACK corresponds to the last packet of a flow, a switch can determine that there is no more unacknowledged data for that flow. Correspondingly, the switch can free the flow channel by removing the corresponding entry in the flow table.

As mentioned above, the input queue manager at each switch can maintain information about transmitted but unacknowledged data of a given flow. FIG. 2B shows an example of how switches along a data path can maintain flow state information. In this example, the data path taken by a flow can include switches 222, 224, and 226. The amount of transmitted but unacknowledged flow data can be indicated by a variable "flow_extent," which can be measured in number of fixed-length data units, such as 256 bytes. Furthermore, flow_extent and other flow state information can be maintained by a switch's input queue manager, which can continuously monitor all the flow-specific queues.

In the example in FIG. 2B, the value of flow_extent at the input queue manager of switch is 1, because there is one unit of data that has been sent out of the input queue and forwarded through the crossbar switch. Note that a data packet sent by an input queue might be temporarily buffered in the output transmission buffer due to the scheduling of all the data packets to be transmitted via an output link. When such a packet is buffered in the output port's transmission buffer, the packet can still be considered by the input queue as transmitted for the purpose of updating the flow_extent value.

Correspondingly, because the input queue for the given flow at switch 226 has six queued data units, and two additional data units are in transit between switches 224 and 226, the flow_extent value at switch 224 is 9. Similarly, the flow_extent value at switch 222 is 13, because there are three data units stored in the input queue at switch 224 and one data unit in transit between switches 222 and 224.

In general, a flow channel can remain allocated to a single flow until all the ACKs for all the packets sent on the flow channel have been returned. This means that flow channel table entries can remain active for longer near the fabric ingress edge port than near the egress edge port. If a single packet is injected into the network, a flow channel can be allocated for the ingress edge port and then another flow channel can be allocated for the next fabric link the packet traverses and so on, until the last flow channel is allocated when the packet reaches the last fabric link. Each allocation can generate a flow ID, denoted as variable "flow_id," to identify the entries of the flow tables of the fabric link. (More details on flow channel tables are provided in the description below in conjunction with FIG. 4A.) This first packet may cause the allocation of a different flow_id, on each of the fabric links the packet traverses across the switch fabric.

At the input queue of each switch, the flow channel table entries can indicate each flow's state information, including the flow_extent value, from this point downstream to the flow's egress destination edge port. Packets received on the local input port can increase this flow_extent value by the amount of incoming data, and ACKs can reduce the flow_extent by the amount of acknowledged, delivered data.

When a packet reaches the final destination egress port, an ACK packet can be generated and returned for that packet. This ACK can be routed using the data path information stored in the corresponding entry of the flow channel tables at every switch along the data path. Optionally, the ACK packet itself does not need to carry path information and therefore can be small and light weight. If no other data packet is sent on the flow, the ACK can release each flow channel in the reverse order. Once released, the flow channel at each switch can be allocated to a different flow.

If another packet follows the first packet on the same flow, the ACK corresponding to the second packet would need to be received before the flow channel can be released at a given switch. In one embodiment, the flow channel can only be released when ACKs for all the transmitted packets of the same flow have been returned.

Typically, various protocols may require in-order packet delivery. The flow channels can be used to guarantee this delivery order, even when the fabric uses adaptive routing for load balancing across multiple data paths. If packets between an ingress edge port and an egress edge port, perhaps in a different switch on the far side of the fabric, are injected at a very low rate, then each packet injected could reach its destination and return an ACK back to the source before the next packet is injected. In this case, each packet can be a lead packet and free to take any path across the fabric, using the best available dynamic adaptive routing choice. This is possible because the first packet can define the flow's path through the fabric.

Now assume that the packet injection rate is increased slightly to the point where the next packet of the same flow is injected before the current packet's ACK has returned to the source. The second packet can pass the ACK of the first packet somewhere along the flow's data path. Beyond this passing point, the ACK will have released the flow channels allocated to the first packet, because the flow_extent value associated with the first packet is returned to zero when the ACK is processed by the flow channel's logic. Meanwhile, the second packet can now define a new flow, because it is again causing flow channels to be allocated on each of the subsequent fabric links. This second packet, while it is causing flow channels to be allocated beyond the passing point, can be forwarded to a different path based on dynamic adaptive routing. On the other hand, before the passing point, the second packet can extend the outstanding flow created by the first packet to include the second packet. This means the first packet's ACK may not reduce the flow_extent value to zero and the flow channels may remain active before the passing point. It also means that the second packet may follow the exact path taken by the first packet up to the passing point. Note that while it is following the previous packet, the second packet cannot arrive at the egress edge port before the first packet does, and therefore correct packet order can be maintained.

If the injection rate for this flow is increased further, the second packet will pass the first packet's ACK at a location closer to the destination edge port. It is also possible that a third, fourth, fifth, or additional packet may enter the fabric before the first packet's ACK is returned to the source edge port, depending on the data packet injection rate of this flow and the data packet-ACK round trip delay. The maximum packet rate can depend on the size of the packets and the bandwidth of the links. The round trip delay of the data packet and ACK can be an important parameter for a fabric implementation and can be used along with the maximum packet rate to calculate the maximum required number of flow channels for each link. Ideally, a design can provide a reasonable number of unallocated flow channels regardless of the traffic pattern. The demand for the number of flow channel can be high when a large number of packets arriving at an ingress edge port have different destinations and these packets have small sizes and high injection rates. In the most extreme case, each packet could be allocated a different flow channel. These flow channels are freed when the packets' ACKs are returned. Correspondingly, the number of flow channels needed can be calculated as ((Packet rate)*(Average packet to ACK round trip latency)).

Note that packet rate on a single flow channel is not to be confused with packet rate on a link. If the traffic pattern is such that many small packets are being sent to different destinations, then successive packets sent onto the link can have different destinations. This means that each packet could belong to a different flow and could be the only packet to use the corresponding flow channel. In this example, the link can experience a high packet rate, but the packet rate of individual flows can be low. Optionally, a number of ACKs (e.g., 48 ACKs) can be aggregated together into a single ACK frame for transmission over a link and protected by a Frame Check Sequence (e.g., a 32-bit FCS). For example, the ACKs can occupy 25 bits each, and there can be a 9-byte overhead to the frame. That is, the overhead per ACK on a full size frame is approximately 9/(25/8*48)*100%=6%. The logic can optimize the number of ACKs per frame so an ACK does not need to wait too long to be aggregated when the ACKs are arriving slowly. For example, the ACK aggregation logic block can use three timers to manage ACK transmission based on the activity of an outgoing link. These timers can be started when a new ACK arrives at the ACK aggregation logic block. If the outgoing link is idle, a first timer, which can for example be set at 30 ns, can be used to hold the ACK while waiting for additional ACKs to arrive. When this timer expires, all the ACK received within the corresponding time window can be aggregated into one frame and transmitted onto the outgoing link. If the outgoing link is busy, a second timer, which can for example be set at 60 ns, can be used to wait for additional ACKs. Using this second timer can allow more ACKs to be aggregated into a single frame, and this frame can be transmitted only if a predetermined number of ACKs are collected. Note that due to the Ethernet framing constrains, some numbers of ACKs in a single frame can use less wire bandwidth per ACKs than other numbers of ACKs. If no efficient number of ACKs are collected, and the outgoing link remains busy sending normal data packets, then a third timer, which can for example be set at 90 ns, can be used. Once this third timer expires, all the ACKs that have been collected can be aggregated in a frame and transmitted onto the link. By using these three timers, the system can significantly reduce the overhead of sending ACKs on the outgoing link.

Figures 3A, 3B, 3C:
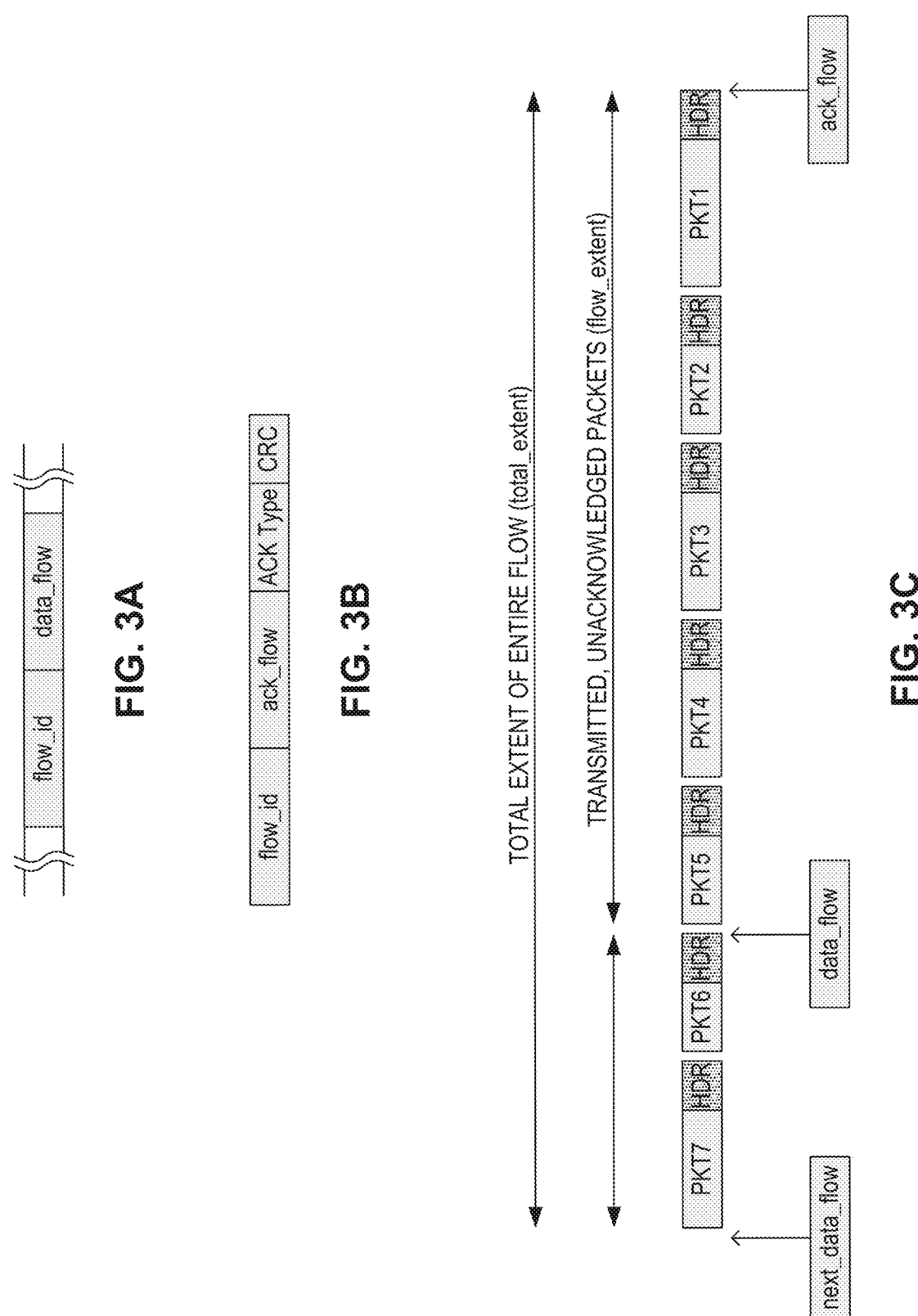
FIG. 3A illustrates an example fabric header for a data packet.
FIG. 3B illustrates an example acknowledgement (ACK) packet format.
FIG. 3C illustrates an example relationship between different variables used to derive and maintain state information of a flow.

In some examples, the ingress edge port of a switch can encapsulate a received data packet with a fabric header, which allows the packet to be forwarded using flow channels. FIG. 3A shows an exemplary fabric header for a data packet. The fabric header can include a flow_id field, which can identify the flow channel, and a "data_flow" field, which can indicate the progression of the entire flow.

When a data packet is delivered to its destination, at least one ACK can be generated. FIG. 3B shows an exemplary ACK packet format. An ACK packet can include a "flow_id" field, an "ack_flow" field, an "ACK type" field, and a cyclic redundancy check (CRC) field. The flow_id field can indicate the flow this ACK packet belongs to. The ack_flow field can indicate the data packet to which this ACK packet acknowledges. Recall that each switch can maintain a flow_extent value which indicates the amount of transmitted but unacknowledged data. The value of flow_extent can be derived as flow_extent=data_flow-ack_flow, wherein data_flow value is taken from the last transmitted data packet.

The ACK type field can indicate different types of ACKs. As mentioned above, during normal operation, when a data packet is delivered to the destination edge port, a regular ACK packet can be generated and sent back to the source. Correspondingly, the ACK type field in the ACK packet can indicate a normal ACK. When congestion occurs in the fabric, the ACK type field can be used to indicate various types and severity of congestion, such as a new congestion, a persistent congestion, or a severe congestion at the egress edge port that calls for rerouting of the flow. In addition, under special circumstances such as the presence of a severely congested fabric link, dropped packets, or link error, an ACK can also be generated by an intermediate switch that is not the final destination, and the ACK type field can be used to notify upstream switches of different types of network condition. Other additional fields can also be included in an ACK packet.

FIG. 3C shows the relationship between different variables used to derive and maintain state information of a flow. In this example, a switch can use the variable "total_extent" to track the total amount of unacknowledged transmitted data and data currently queued at the switch. The value of total_extent can equal the sum of flow_extent, which is the amount of transmitted and unacknowledged data, and queue_extent, which is the amount of data stored in the input queue for the corresponding flow. The variable "ack_flow" can indicate the data position that corresponds to the latest ACK for this flow. The variable "data_flow" can indicate the position of the next data packet to be transmitted, which also corresponds to the data packet stored at the head of the input queue. The variable "next_data_flow" can indicate the position of the next data packet that the switch can expect to receive from the upstream switch. Note that queue_extent=next_data_flow-data_flow, and flow_extent =data_flow-ack_flow.

Figure 4A:
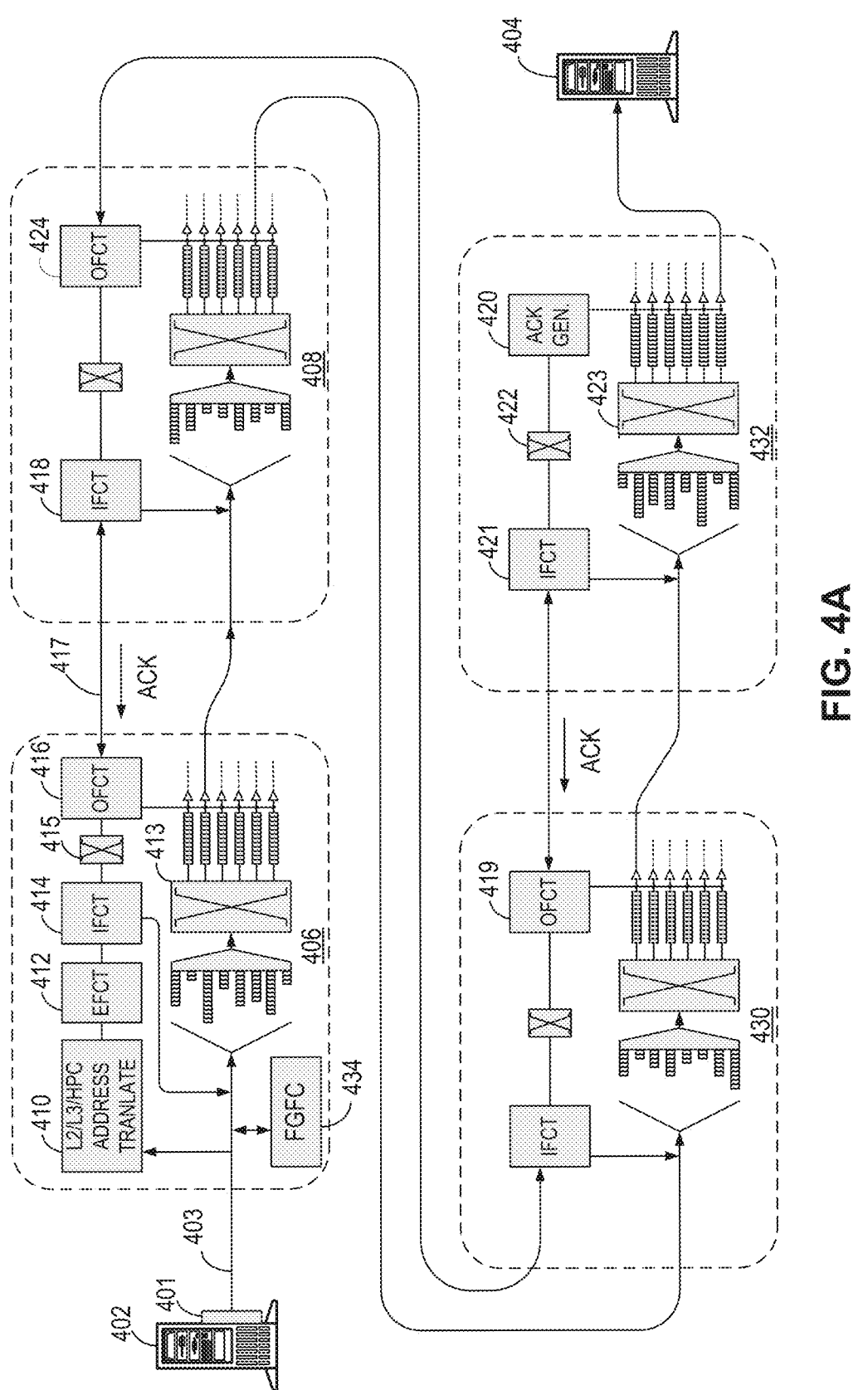
FIG. 4A illustrates an example of how flow channel tables can be used to deliver a flow.

In some examples, flow channel tables can be used to facilitate flow channels throughout a fabric is. Flow channel tables are data structures that store the forwarding and state information for a given flow at the port of a switch. FIG. 4A shows an example of how flow channel tables can be used to store state information associated with multiple flows. This state information can be specific to each flow and efficiently stored in a table. Assume that a source host 402 is sending data packets to a destination host 404 via a fabric. The data path traversed by the data packets can include an ingress edge switch 406, intermediate switches 408 and 430, and egress edge switch 432.

When a packet arrives on an ingress edge link 403 of switch 406, the packet's header can be analyzed by an address translate logic block 410. Address translate logic block 410 can determine the destination fabric address of the egress switch (which in this case is switch 432) based on the packet's Ethernet, IP, or HPC header information. Note that header information associated with other protocols or a combination of different protocols can also be used by address translate logic block 410. The fabric destination address determined by address translate logic block 410 can then be used to perform a lookup in an edge flow channel table (EFCT) 412. EFCT 412 can perform a lookup operation for the packet using the packet's fabric destination address and optionally additional values extracted from the packet's header, which can be referred to as a match pattern. EFCT 412 can compare the packet's match pattern against stored match patterns of all existing allocated flows. If a match is found, then this packet is part of an existing flow and the previously allocated flow ID can be returned for this packet. If no match is found, a new flow ID can be allocated for this packet, and a match pattern can be added to EFCT 412. In other words, EFCT 412 can be used to determine whether a flow channel already exists for the incoming packet, or whether a new flow channel needs to be allocated. In addition to the destination fabric address, other packet header information such as traffic class, TCP or UDP port number, and process or thread ID can be used to map or allocate flow IDs.

The flow ID obtained by EFCT 412 can then be used as an index to map to an entry in an input flow channel table (IFCT) 414. Each entry in IFCT 414 can be indexed by a flow ID and store state information for the corresponding flow. An entry in IFCT 414 can store the values of next_data_flow, data_flow, and ack_flow (see FIG. 3C) associated with a flow. In addition, an IFCT entry can store other parameters for congestion control and dynamic routing for a flow.

The flow ID can also be used to identify or allocate a flow-specific input queue in which the incoming packet can be temporarily stored. The state information for a particular queue, as well as parameters for monitoring and controlling the queue (such as threshold for detecting congestion) can be stored in the corresponding entry in IFCT 414. An input queue management logic block can determine when a packet can be dequeued from the input queue and sent to a data crossbar switch 413 based on flow-control parameters stored in the entry of IFCT 414.

When a packet is dequeued from the input queue and sent through crossbar switch 413 to an output port, the packet is sent with the input port number on which it has arrived at switch 406. When the packet reaches an output port's transmission buffer, the packet's header can be updated, based on the packet's flow ID and input port number, with a new flow ID to be used by the next-hop switch (i.e., switch 408) for the same flow. This is because each link, in each direction, can have its own set of flow channels identified by their respective flow IDs. The mapping from the incoming flow ID to the outgoing flow ID used on the next link can be done by looking up an output flow channel table (OFCT) 416. OFCT 416 can perform a lookup using a match pattern that is a combination of the local input port number corresponding to link 403 and the packet's flow ID which is produced by EFCT 412. If a match is found, then the flow has already been defined, and the packet's flow ID is updated with the value corresponding to the match pattern (this new outgoing flow ID is to be used by the downstream next-hop switch 408). If a match is not found, then a new flow channel can be allocated with a new, outgoing flow ID, which can be mapped to the input port number and the previous, incoming flow ID. An entry including the outgoing flow ID, input port number, and incoming flow ID can be stored in OFCT 416.

In the case where the packet is the first packet in the flow, a lookup in OFCT 416 would not produce any mapping. In turn, OFCT 416 can allocate for the packet a flow channel with a flow ID to be used by the input port and IFCT 418 on switch 408. This new flow channel, identified by its flow ID, can be added to the packet header for transmission onto link 417, and can be used by the link partner's (which is switch 408) IFCT 418 to access the flow channel's congestion information. As before, OFCT 424 can further generate a new flow channel if no match is found, using the match pattern of its immediate upstream input port number and flow ID associated with link 417. OFCT 424 can then allocate a new flow channel identified by a new flow ID. Note that OFCT 416 can also function as a forwarding table for ACKs of this flow in the upstream direction. After being forwarded upstream from switch 408 to switch 406, the ACK packet can be updated with the flow ID associated with edge link 403 and forwarded to the appropriate input port on switch 406 as indicated by the corresponding entry in OFCT 416. The ACK packets can be forwarded to the input port by an ACK crossbar switch 415 in the upstream direction.

Subsequently, when the packet arrives at switch 408, its flow ID can be used to identify an input queue to use and to determine an entry in IFCT 418. If the packet's flow ID has not been previously allocated by switch 408, a new input queue can be provided and a new entry in IFCT 418 can be created. From this point onward, a similar process can be performed to forward the packet across switches 408 and 430 until the packet reaches egress switch 432.

When the packet reaches switch 432, after the packet is forwarded by a data crossbar switch 423, an ACK generator logic block 420 can generate an ACK packet based on the packet's flow ID and input port number. This ACK packet can then be forwarded in the upstream direction by an ACK crossbar switch 422. At the same time, based on the ACK packet, an IFCT 421 can update the state information for the flow in the corresponding table entry. When the ACK packet reaches switch 430, an OFCT 419 can be looked up to determine the upstream flow ID and upstream input port to which the ACK packet is to be forwarded. The ACK packet can then have its flow ID updated and be forwarded to the appropriate input port in the upstream direction. As the ACK packet traverses the data path upstream in a similar way, the IFCT at each switch can update its table entry for the flow based on the ACK.

Note that the flow_extent variable can be an important parameter, because it represents the total amount of downstream packet data for a flow. A flow channel is considered free to be reallocated to another flow when the flow_extent of an entry is zero. In general, on receipt of a new packet, the input logic can make a request to send data to an output port. The selected output port can be a function of the flow_extent stored in the IFCT. If flow_extent is zero, there are no packets downstream in the flow to the destination egress edge port. As a result, the switch can use a load based adaptive route selection to choose any valid path that leads to the destination. In a multi-path network, dynamic adaptive routing can be done without the packet being reordered. If flow_extent is not zero, and if in-order delivery is required, the packet can use the same route taken by previous packets. The IFCT can have a field that stores a previous output port number, which is loaded when a packet request is made to an output port and can be used to ensure a connection to the previously used output port.

As mentioned before, the flow channels can use a match function to recognize packets belonging to an existing flow. Received Ethernet frames or other types of packets can be parsed in real time when the frame or packet is received on an ingress edge port and some fields of the packet header can be used for a lookup in a CAM or Ternary Content Addressable Memory (TCAM). If there is a match, the match address can become the flow ID used to select a flow channel. When no match occurs, the switch hardware can load the pattern that fails to match directly onto a free line of the CAM, which can be done without additional delay. As a result, any following packet can be matched to this new entry without significant amount of buffering. The free entry chosen becomes the new flow ID for the new flow channel entry. Note that no external software intervention is required for the loading of the new entry. The process can be completed autonomously by the switch hardware.

The de-allocation of flow IDs and corresponding CAM match lines can also be automatically performed by the hardware when the last ACK is returned for the flow. The de-allocation can occur in hardware with respect to potentially matching new packets, without external software intervention.

In some examples, ingress edge switch 406 can include a fine-grain flow control logic block 434, which can communicate with a network interface controller (NIC) 401 on host 402 to apply flow control on a per-flow basis. More details on find-grain flow control are provided below in conjunction with the description on congestion management.

Figures 4B, 4C, 4D:
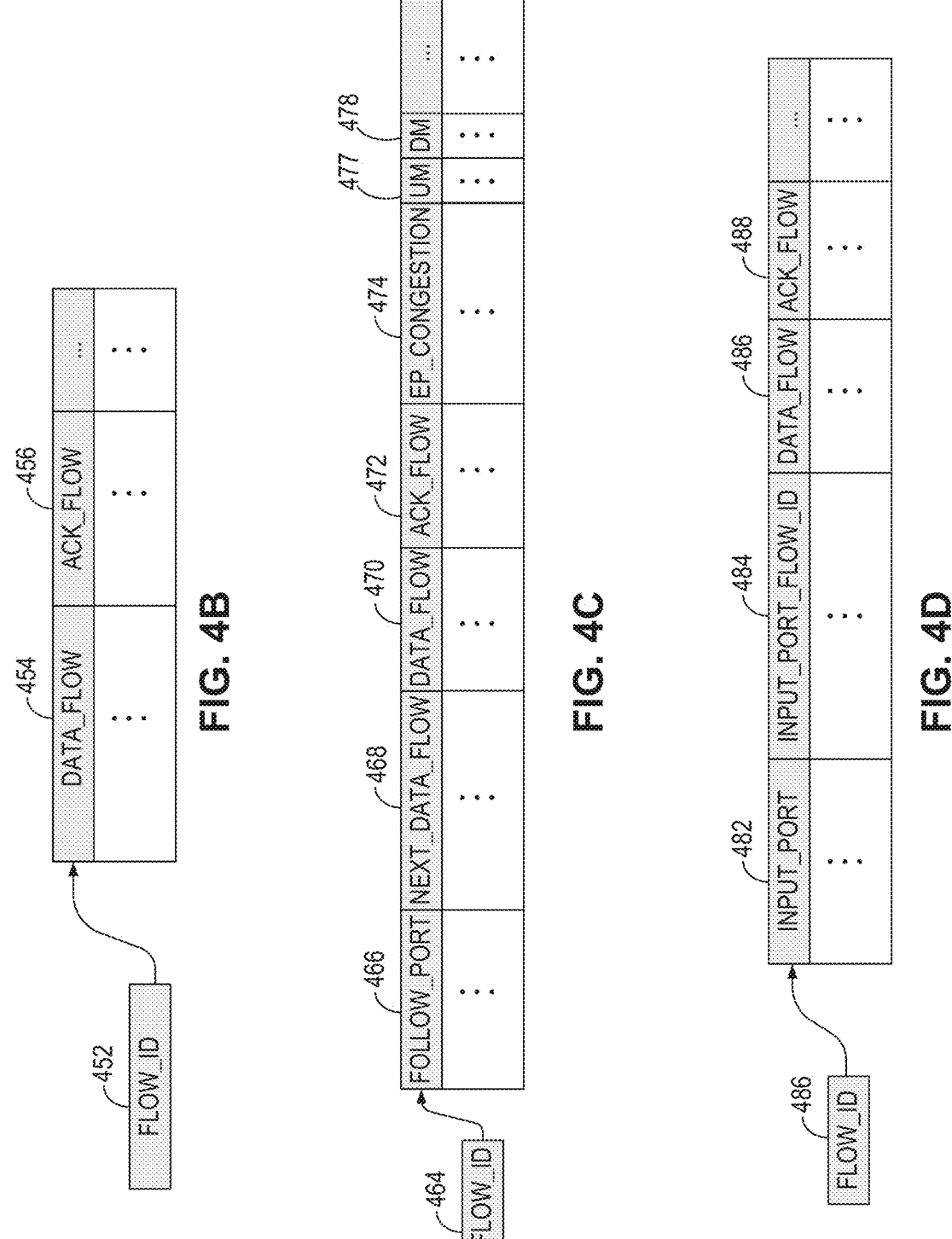
FIG. 4B illustrates an example of an edge flow channel table (EFCT).
FIG. 4C illustrates an example of an input flow channel table (IFCT).
FIG. 4D illustrates an example of an output flow channel table (OFCT).

FIG. 4B shows an example of an EFCT. In this example, an EFCT can include a data_flow field 454, an ACK_flow field 456, and optionally additional fields. The EFCT can be associated with an input port, and entries in the EFCT can be indexed by flow_ID values, such as flow_ID 452. In one embodiment, the match pattern field can reside in the match function logic block, which can include a CAM or TCAM. The match function logic block can use the match pattern to generate the flow_ID value, which in turn can be used as an index to the corresponding EFCT entry. From this EFCT's perspective, the flow_extent (i.e., data_flow-ack_flow) can include all the unacknowledged data downstream of this table, which can include the local flow_queue plus the corresponding IFCT's flow_extent value.

FIG. 4C shows an example of an IFCT. In this example, an IFCT can be associated with an input port, and can include a follow_port field 466, a next_data_flow field 468, a data_flow field 470, an ACK_flow field 472, an ep_congestion vield 474, an upstream metering (UM) flag field 477, a downstream metering (DM) flag field 478, and optionally additional fields. An incoming packet's flow_ID value, such as flow_ID 464, can be used as an index to look up the output port number, which is indicated by follow_port field 466, and the state information associated with the corresponding flow. Congestion-control information associated with endpoint congestion (such as ep_congestion field 474) and (hop-by-hop credit-based flow control (such as UM flag field 477 and DM flag field 478), which is described in more detail later in this document, can also be stored in the IFCT. The IFCT can further store information related to dynamic routing associated with different flows.

FIG. 4D shows an example of an OFCT. In this example, an OFCT can be associated with an output port, and can include an input_port field 482, an input_port_flow_ID field 484 (which corresponds to a packet's existing flow_ID upon its arrival at an input port), a data_flow field 486, an ACK_flow field 488,, and optionally additional fields. Data_flow field 486 and ACK_flow field 488 can be used to determine the value of flow_extent from this OFCT onward. The combination of input_port field 482 and input_port_flow_ID field 484 (which can also be referred to as "incoming flow_ID") can be used to determine or allocate the outgoing flow_ID of a packet that is ready for transmission onto the outgoing link corresponding to this OFCT. In one embodiment, the outgoing flow_ID values, such as flow_ID 486, can be used as an index to look up entries in the OFCT.

Flow Channels in Multi-path Network

As previously described, flow channels can define a path, for each communication, across a network. The first packet in the flow can define the path, and if the flow remains valid, subsequent packets can be forced to follow the same path (defined by the flow channel) as that taken by the first packet. High performance fabrics can have many routes from a particular source to another destination. Multi-path networks allow greater total bi-sectional network bandwidth. In most cases, HPC systems include a multi-path network. A common metric used to measure the performance of a multi-path network is the global bandwidth (the total bandwidth delivered on an All-to-All communication pattern). In most networks, each node in the system sends packets over a set of links used to transmit data from one source to a destination. Some methods use a hash value generated from values found in the packet header. Although this improves the performance, it can also suffer from systemic bad behavior leading to unpredictable performance. Using local load information to make dynamic adaptive routing decisions can be an improvement to the aforementioned hash-based techniques. However, using loads information can allow packets of a single stream to be re-ordered. For example, re-ordering may occur when a packet is sent in a new direction as result of routing decision, and overtakes a packet sent in the old direction.

This type of unordered delivery (or re-ordering) can be a serious problem for some network protocols. Notably, most Ethernet networks should deliver packets in order. With respect to HPC environments, ordering requirements can vary depending on the programming model. In yet another example, MPI requires point-to-point ordering of messages, but does not require bulk data to be delivered in order. PGAS remote memory access model also require point-to-point ordering of accesses to the same address, but can allow re-ordering of operations acting on distinct addresses. Different transport layers should be able to specify their minimum ordering requirements and the switch fabric should be able to meet these requirements.

Allowing a true dynamic adaptive routing decision for every packet, at every routing stage, could result in re-ordering of packets within the same flow from a source to a destination. Thus, using a packet-level dynamic routing approach, can cause the packets of the flow to be scattered throughout a multi-path fabric. As a result, any control of the flow, as a flow of packets, may be lost. Although packet-level dynamic routing can be a good model for some network traffic patterns, such as Uniform Resource Locator (URL) traffic exemplified by the Giga Updates per Second (GUPS) benchmark. For instance, GUPS typically generates many small packets, with each being sent a random destination. Thus, in a large network using GUPS, individual flows from a particular source to a particular destination rarely have a chance to form with such traffic and the adverse effects of a sustained flow may never occur. In the case of GUPS, dynamic adaptive routing of the small packets to random destinations may produce a very balanced load across the fabric. Nevertheless, adaptive routing based on flow channels, as disclosed herein, can lead to optimal routing in each of the aforementioned examples of networking environments.

Utilization of flow channels enables a true dynamic adaptive route decision for the first packet of a new flow, based on the local load of the network. Referring back to MPI and PGAS environments, where small messages are generated, these messages appear as new flows to a fabric that is implementing flow channels. The flow channels can allow for fully adaptive routing, resulting in a very similarly balanced load that can be generated across the fabric (UR traffic is an extreme case).

Regarding network environments that require point-to-point ordering (or where point-to-point ordering is desirable), using flow channels can ensure that subsequent packets in the flow are forced to follow the first packet preventing packet reordering. Furthermore, flow channels give an opportunity to handle lost packets caused by link errors. Every packet sent onto a link can be re-ordered in the flow channel state. The input logic can detect missing packets form the flow by observing a "hole" in the flow. The missing packet (or position of the hole) can be signaled back to the source of the flow.

In addition, with respect to network environments that do not require point-to-point ordering, flow channels can still be used to provide significant advantages. For example, if an unordered traffic class has been defined, then every packet in a flow can be allowed to adaptively route. Thus, instead of a single path being defined across the multi-path fabric, a tree of paths will form that all converge to the same destination. Each flow, on each downstream fabric link, will have a packet pass through it, and will have more packets pass through it, if the same output port is used again. All downstream flow channels will point back to the same upstream flow channel. An individual ack will retrace the path taken by the packet that created the ack at the egress edge port. When these packets arrive at the destination, they may be out of order. However, by using flow channels, the following advantages can be realized:

The total amount of injected packet data for a flow can still be accurately measured by the ingress flow tables. This means the node injection limit, used to the limit the total amount of the packet data in the network, can still be active. This limit preserves the fabric input buffer space, even on tapered fabrics and in so doing prevents congestion developing.

The acks can still signal back to a source edge port that the destination is congesting, either because the node is saturated and/or an incast is forming. These acks can then control the congestion in two ways; first limiting the total amount and also the maximum bandwidth this flow can inject into the fabric, and secondly forcing the flow to become ordered. Once ordered, the flow channel tree that may have started, will collapse back into the single source destination flow.

Unordered traffic can provide excellent performance for sympathetic traffic patterns, especially for HPC. However, unordered traffic can also aggravate congestion traffic patterns. Unordered traffic also can consume available fabric bandwidth to the point where other applications that may be sharing the same fabric and have other traffic patterns with much longer flows, may be prevented from making any significant progress. In contrast, flow channels, having injection limits, manage the fabric utilization of each application such that each application keeps their access fair. As disclosed herein, adaptive routing using flow channels allows for both dynamic adaptive routing and in-order delivery of packets (e.g., preventing re-ordering).

Adaptive Routing Using Flow Channels in a Multi-path Network

As previously described, flow channels can define a path, for each communication, across a network. The first packet in the flow can define the path, and if the flow remains valid, subsequent packets can be forced to follow the same path (defined by the flow channel) as that taken by the first packet. High performance fabrics can have many routes from a particular source to another destination. Multi-path networks allow greater total bi-sectional network bandwidth. In most cases, HPC systems include a multi-path network. A common metric used to measure the performance of a multi-path network is the global bandwidth (the total bandwidth delivered on an All-to-All communication pattern). In most networks, each node in the system sends packets over a set of links used to transmit data from one source to a destination. Some methods use a hash value generated from values found in the packet header. Although this improves the performance, it can also suffer from systemic bad behavior leading to unpredictable performance. Using local load information to make dynamic adaptive routing decisions can be an improvement to the aforementioned hash-based techniques. However, using loads information can allow packets of a single stream to be re-ordered. For example, re-ordering may occur when a packet is sent in a new direction as result of routing decision, and overtakes a packet sent in the old direction.

This type of unordered delivery (or re-ordering) can be a serious problem for some network protocols. Notably, most Ethernet networks should deliver packets in order. With respect to HPC environments, ordering requirements can vary depending on the programming model. In yet another example, MPI requires point-to-point ordering of messages, but does not require bulk data to be delivered in order. PGAS remote memory access model also require point-to-point ordering of accesses to the same address, but can allow re-ordering of operations acting on distinct addresses. Different transport layers should be able to specify their minimum ordering requirements and the switch fabric should be able to meet these requirements.

Allowing a true dynamic adaptive routing decision for every packet, at every routing stage, could result in re-ordering of packets within the same flow from a source to a destination. Thus, using a packet-level dynamic routing approach, can cause the packets of the flow to be scattered throughout a multi-path fabric. As a result, any control of the flow, as a flow of packets, may be lost. Although packet-level dynamic routing can be a good model for some network traffic patterns, such as Uniform Resource Locator (URL) traffic exemplified by the Giga Updates per Second (GUPS) benchmark. For instance, GUPS typically generates many small packets, with each being sent a random destination. Thus, in a large network using GUPS, individual flows from a particular source to a particular destination rarely have a chance to form with such traffic and the adverse effects of a sustained flow may never occur. In the case of GUPS, dynamic adaptive routing of the small packets to random destinations may produce a very balanced load across the fabric. Nevertheless, adaptive routing based on flow channels, as disclosed herein, can lead to optimal routing in each of the aforementioned examples of networking environments.

Utilization of flow channels enables a true dynamic adaptive route decision for the first packet of a new flow, based on the local load of the network. Referring back to MPI and PGAS environments, where small messages are generated, these messages appear as new flows to a fabric that is implementing flow channels. The flow channels can allow for fully adaptive routing, resulting in a very similarly balanced load that can be generated across the fabric (UR traffic is an extreme case).

Regarding network environments that require point-to-point ordering (or where point-to-point ordering is desirable), using flow channels can ensure that subsequent packets in the flow are forced to follow the first packet preventing packet reordering. Furthermore, flow channels give an opportunity to handle lost packets caused by link errors. Every packet sent onto a link can be re-ordered in the flow channel state. The input logic can detect missing packets form the flow by observing a "hole" in the flow. The missing packet (or position of the hole) can be signaled back to the source of the flow.

In addition, with respect to network environments that do not require point-to-point ordering, flow channels can still be used to provide significant advantages. For example, if an unordered traffic class has been defined, then every packet in a flow can be allowed to adaptively route. Thus, instead of a single path being defined across the multi-path fabric, a tree of paths will form that all converge to the same destination. Each flow, on each downstream fabric link, will have a packet pass through it, and will have more packets pass through it, if the same output port is used again. All downstream flow channels will point back to the same upstream flow channel. An individual ack will retrace the path taken by the packet that created the ack at the egress edge port. When these packets arrive at the destination, they may be out of order. However, by using flow channels, the following advantages can be realized:

The total amount of injected packet data for a flow can still be accurately measured by the ingress flow tables. This means the node injection limit, used to the limit the total amount of the packet data in the network, can still be active. This limit preserves the fabric input buffer space, even on tapered fabrics and in so doing prevents congestion developing.

The acks can still signal back to a source edge port that the destination is congesting, either because the node is saturated and/or an incast is forming. These acks can then control the congestion in two ways; first limiting the total amount and also the maximum bandwidth this flow can inject into the fabric, and secondly forcing the flow to become ordered. Once ordered, the flow channel tree that may have started, will collapse back into the single source destination flow.

Unordered traffic can provide excellent performance for sympathetic traffic patterns, especially for HPC. However, unordered traffic can also aggravate congestion traffic patterns. Unordered traffic also can consume available fabric bandwidth to the point where other applications that may be sharing the same fabric and have other traffic patterns with much longer flows, may be prevented from making any significant progress. In contrast, flow channels, having injection limits, manage the fabric utilization of each application such that each application keeps their access fair. As disclosed herein, adaptive routing using flow channels allows for both dynamic adaptive routing and in-order delivery of packets (e.g., preventing re-ordering).

Adaptive Routing Using Flow Channels in a Congested Network

Figure 5:
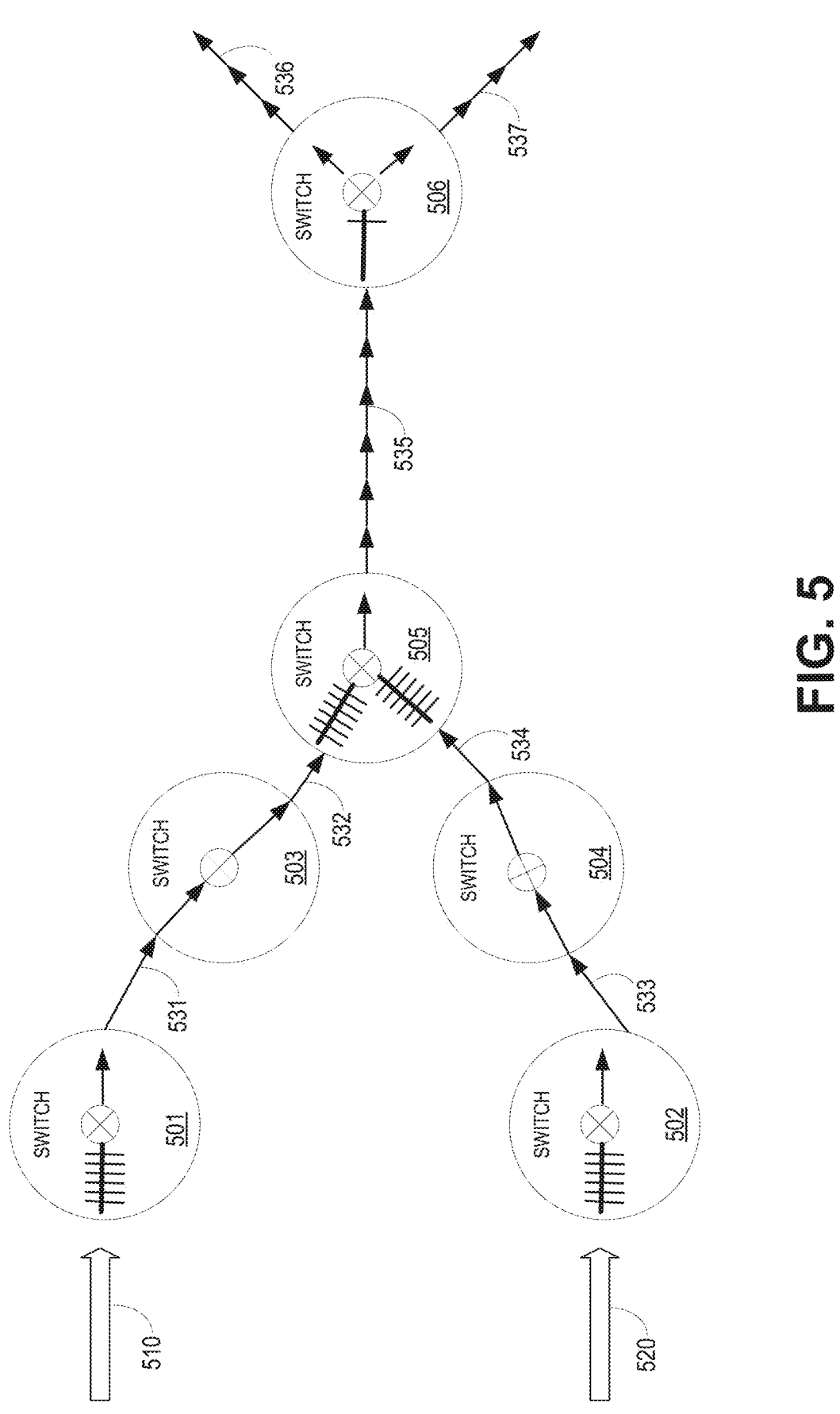
FIG. 5 illustrates an example of a network experiencing congestion, where adaptive routing and "on the flow" routing can be implemented.

FIG. 5 illustrates an example of congestion flows 510, 520 in a multi-path network 500 including multiple switches 501-506 and multiple paths 531-537. By implementing dynamic adaptive routing in accordance with the disclosed embodiments, these congested flows can be identified (e.g., congestion source or congestion victim), and then routed accordingly. In addition, the load across the multi-path network 500 can be distributed via the disclosed dynamic adaptive routing techniques. In the illustrated example of FIG. 5, two flows 510 and 520 are shown. Flow 510 can have a different destination than the destination for flow 520

(destinations not shown). However, both of the flows 510, 520 share a congested link 535. The flows 510, 520 may be persistent flows. As referred to herein, persistent flows can be described as flows that persist for a long time without interruption. Being persistent flows 510, 520 can have the potential to saturate the links 531-537 links at full bandwidth. The lead packet in one of the flows, for instance flow 510, can establish the path across the network 500. Subsequently, the succeeding packets in the flow, such as flow 510, can continue on this path established by the first packet, which can maintain the order of the packets in the flow. New flows could adapt around this established flow, but if all of the new flows are also persistent and congestion flows, then traffic patterns could become static and considerable less optimal if not adaptively routed. Accordingly, the disclosed adaptive routing techniques can leverage flow channels to address the negative impacts of congestion in the presence of persistent flows, such as flows 510, 520. As a general description, congestion can be cause by bottlenecks within a system. Bottlenecks can include, but is not limited to:

The final link—if many sources are trying to send a to a single destination, as in the case for an incast.

A NIC—if the NIC is not eagerly consuming packets.

A change in bandwidth—if bandwidth changes from a high bandwidth link to a lower bandwidth link.

A single link—of a single link in the body of the network has had too many flows directed through it.

In FIG. 5, the example illustrates a single link 535 that can be a bottleneck. As shown, link 535 is experiencing congestion. For example, switch 505 can have a fabric egress port (with a deep egress port header FIFO) that is congesting the link 535. The manner in which a bottleneck can be addressed may depend on how and where the bottleneck is detected. If the flow is to be rerouted, then the adaptive routing technique considers whether a reasonable degree of confidence that the change from rerouting will reduce congestion. For instance, the adaptive routing techniques may determine that flow 510 is a source of congestion. Being a source of congestion, as compared to merely a victim, can indicate that there is a high degree of confidence as it pertains to rerouting that flow. Thus, if flow 510 is identified as a source of congestion, then adaptive routing techniques can decide to limit the routing of flow 510, or otherwise constrain the routing decisions for flow 510 in a manner that prevents that flow from further spreading congestion in the network 500. Conversely, the adaptive routing techniques may determine that flow 520 is a victim of congestion (as opposed to a source). As a victim flow, there may be a small degree of confidence in rerouting that particular flow. Restated, rerouting a victim flow, such as flow 520, will not significantly prevent more congestion from occurring on the network 500. Therefore, the adaptive routing techniques allows flow 520 to continue making its own adaptive routing decisions under the assumption that a victim flow will not substantially impact congestion on the network.

In practice, adaptively routing a persistent flow that is a cause of congestion, such as flow 510, can reroute the flow 510 by directing it around the existing bottleneck. This rerouting decision can be based on the concept that effective redirecting a flow ensures that the new path does not return to the same bottleneck before reaching the final edge port. The new route for the flow, which is selected from adaptive routing, can have spare capacity on each link along its whole path to provide improvements in transmission over the initial route.

Flow channels can give visibility to the whole flow, from the source to the destination. Along a flow's path, there may be a point of minimum bandwidth. Beyond that point of low bandwidth, packets can be accepted very quickly from the input queues. Thus, input queues can be typically empty (or nearly empty). In contrast, before the point of low bandwidth, in the case of persistent flows, the packets will most likely be building up in an output port's FIFO. On the ingress edge switch, before the switch with the congestion queue, the flow control mechanism will be restricting the delivery rate to cap the total amount of node and flow data within the fabric. Referring back to FIG. 5, the point of low bandwidth in the network 500 is considered to be at the congestion link 535. As seen, downstream from link 535 at switch 506, its input queue is shown to be uncongested, or empty (e.g., indicated by few vertical lines). At switch 505, before the point of low bandwidth on link 535, its output (or egress) port is illustrated as being congested due to a build-up of packets (indicated by multiple arrows). Farther upstream from the point of low bandwidth at link 535, specifically at ingress edge switches 501 and 502, the flow control can implement injection limits to prevent too much data from entering the fabric by holding packets at their respective input queues (indicated by many vertical lines).

Adaptive Re-Routing Using Flow Channels in a Congested Network

Further, the adaptive routing techniques disclosed herein, can implement flow rerouting in order to redirect flows away from congesting fabric links. The performance of a fabric can depend on the load on the links being balanced across the whole fabric. With adaptive routing steering subsequent packets away from heavily loaded links, balancing can be achieved. Adaptive routing can also rely on injection limits that are part of every edge ingress ports IFTC, in order to prevent too much data from entering the fabric, as illustrated in FIG. 5.

Injection limits can be especially important on tapered fabric, where the number of expensive optical global links has been reduced in favor of costs considerations. These tapered global links can provide a mid-fabric bandwidth bottleneck and are a natural place for congestion to build. The injection limits cap the total fabric data. A fabric may be considered well-balanced, if there is no single egress fabric port onto a global link that is overloaded, and every global link has a significant load. Another characteristic of a well-balanced, can include few expensive links that are not contributing to data delivery. Conversely, a unbalanced fabric may be characterized by a depth of output FIFO for an overloaded global fabric egress port becoming too deep. By implication, and assuming there are active injection limits, other global fabric egress ports will be underutilized. This means that an attempt to move (or redirect) some of the flows currently using the overloaded link will likely result in them being directed towards the underutilized global links and should provide a significant rebalancing of the fabric.

The depth of the egress ports output FIFO can be a good measure of the port load. If the depth itself and rate of change of depth (first derivative of depth) can be combined to provide a measure (or value) of congestion on the port. The magnitude of the congestion value can then be used to decide if redirecting a flow should be attempted. For example, an overloaded port may have too many flows using it. In general, in order to gain the right balance, only a few flows should be redirected from this port. Moving too many flows may result in an underloaded port, which is also associated with certain drawbacks.

According to the embodiments, a flow can be redirected (or moved) by returning a "redirection ack." Unlink a normal ack that is generated by any packet of a flow as it passes, a redirection ack belongs to the flow and can be generated by any packet of flow as it passes. Like all other acks, it follows the path of the flow upstream towards the edge ingress port.

In an embodiment, redirection acks can be generated by observing the degree of congestion in a header output FIFO of a global fabric egress port when the frame is loaded into this FIFO. At this point, the magnitude of the congestion can be measured and this can be compared to a locally created random number. If the congestion value is greater than the random number, a redirection ack is returned for this flow. Using a random number gives a probability of generating a redirection ack that is proportional to the magnitude of the congestion. In other words, only some flows will be redirected during more nominal congestion conditions, but more flows will being to be redirected if the congestion is becoming sever. This ensures that too many flows are not unnecessarily moved, which can lead to issues (e.g., underloaded port).

When an enabled IFCT receives a redirected ack, the state of this flow in this IFCT is changed from RUNNING to BLOCK_FOR_REDIRECT. This state prevents any new packets from being dequeued from this flow's flow queue until the flow_extent becomes zero. The flow_extent will become zero when all of the acks for all of the packets of the downstream flow have been returned. At this point, the state can be changed back to RUNNING because adopting a new path will be safe from an ordering perspective as the next packet, adopting the new path, cannot overtake the previous packet. The first packet to be released after the state changes back to RUNNING can use the best adaptive load information to select the least congested path through the fabric.

On The Fly Routing Using Flow Channels

As alluded to above, flow channels use Acks to signal the progress of packets along the flow. Additionally, flow channels offer the opportunity to pass other information back towards the source of the flow. In particular, Acks can be leveraged by flow channels to achieve a type of "on the fly" routing, which can prevent packets being repeatedly sent towards broken or failing links.

Multipath networks enable much greater bi-sectional bandwidth by providing many different paths to a particular destination. Adaptive routing techniques, which can be used on early routing decisions, can select a more lightly loaded path for the packets to take. However, later routing choices, closer to the destination, tend to be limited and are often forced to a single link. Adaptive routing is used "up" to the root switch; a direct minimal path is then taken "down" to the destination. In some networks, there are multiple minimal paths, but others may only have one. If this link is broken or generating a high rate of errors there is usually no alternative path that packets can take to avoid the bad link. To make matters worse, flows that end up using these broken paths will tend to enter higher level recovery procedures to correct the errors generated by the bad link. This reduces the bandwidth of these flows and this in turn makes these paths across the network more attractive to the adaptive routing mechanisms. Even more flows may be directed towards the bad link.

According to the embodiments, flow channels can convert the Acks using such bad links to ErrorAcks. This Ack type can be used to adjust the adaptive route tables of earlier switches. This "on the fly" routing technique can be used to restrict the set of fabric destinations using a given link. By using "on the fly routing" when a new flow attempting to use the broken link performs the adaptive route selection in an earlier switch, the links that could direct the flows path towards the broken link are removed. The broken flow itself could also be rerouted onto an alternative path. Other fabric destinations that would not normally use the broken link are effectively unimpacted, and could continue to use all the adaptive choices including the links that were taking packets to the broken link. Referring back to FIG. 5, in an example, a flow can encounter link 534 (between switch 504 and 505), and determine that the link is broken. Typically, link failures are bidirectional. Restated, if a link is not supporting traffic flow in both directions, it is failed. As referred to herein, links within the switch fabric can include:

Edge links—those that connect to nodes or other networks
Local links—those that interconnect switches within a group
Global links—those that interconnect groups As a result, an ErrorAck can transmitted be transmitted upstream. Thus, new flows entering the fabric, for instance at edge ingress switch 502, that would otherwise be directed towards the failed link 534 can have their path updated "on the fly" in a manner that avoids that failed link.

Figure 6:
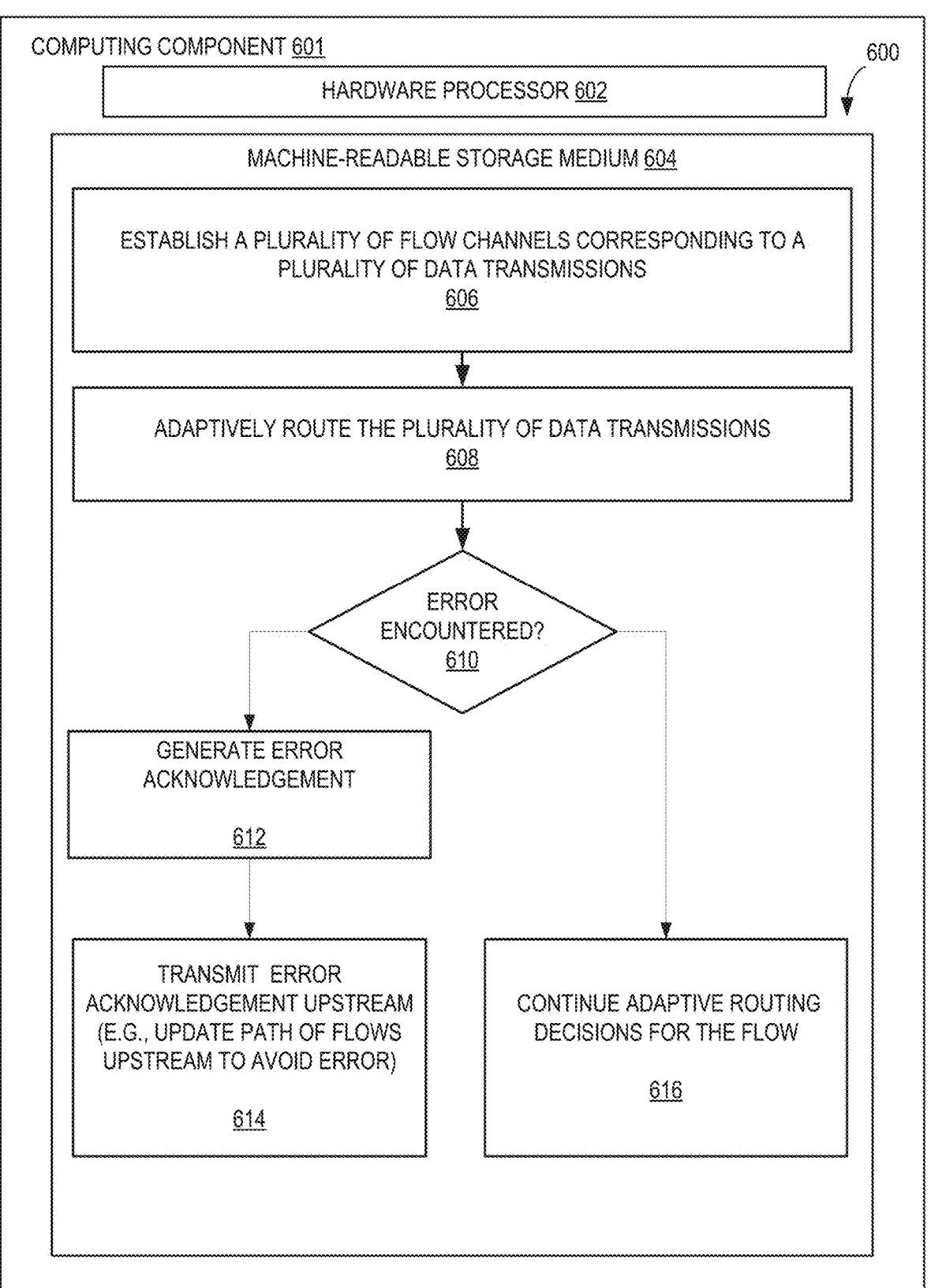
FIG. 6 illustrates a flow chart of an exemplary process of "on the fly" routing in the presence of errors, in accordance with various embodiments.

Referring now to FIG. 6, an example of a process 600 for "on the fly" routing in the presence of errors is depicted. The process 600 can be implemented by a network switch (as shown in FIG. 1). Thus, the process is illustrated as a series of executable operations stored in a machine-readable storage media 604, and being performed by hardware processors 602 in a computing component 601. Hardware processors 602 execute the process 600, thereby implementing the disclosed techniques herein.

Generally speaking, networks perform poorly in the presence of extreme errors, such as link failures between switches. The disclosed "on the fly" routing techniques in process 600 leverages awareness of a source these types of errors along a transmission path, in order to dynamically manage the routing of flows upstream. Also, process 600 employs communicating error information via acknowledgements. As described throughout, the disclosed "on the fly" routing techniques employ flow channels for managing flows. Flow channels can provide very fine grain control of the flow of frames from a source to a destination. Furthermore, IFCTs can enable feedback from early frames of a flow, delivered by acks.

The process can being at operation 606 by establishing a plurality of flow channels that correspond to a plurality of data transmissions. For example, in a network having a switch fabric (shown in FIG. 1), or a plurality of switches, data may be transmitted from a source ports to a destination port traversing fabric ports within the body of the network. Operation 606 involves establishing a plurality of flow channels corresponding to these data transmission. Flow channels are described in detail throughout, for example in reference to FIG. 2A and FIG. 2B. In accordance to the embodiments, switches can implement establishing flow channels and maintaining flow channels. As an example, a flow channel for a flow that is communicated within the plurality of data transmissions (from a source port to a destination port) may be established at operation 606. The flow channel may maintain the path and the amount of data belonging to that flow (and each flow in the plurality of data transmissions) using a set of dynamically connecting flow tables and flow channel queues (at ingress ports). As each flow and its path corresponds to a flow channel, each flow channel that is established is tied to a source port and destination port pair.

The process can proceed to operation 608, where the plurality of transmissions are routed through the network via the switch fabric. According to the embodiments, the switches in the fabric are configured to perform adaptive routing of traffic on a flow-by-flow basis. Thus, operation 608 can involve routing the plurality of data transmissions, using adaptive routing. As described above, adaptive routing in operation 608 can maintain the order of packets in a flow (by routing on a flow-by-flow basis), which is particularly desirable in networking environments that require point-to-point ordering. Details of adaptive routing in a multipath network and in-order packet delivery are described in detail in reference to FIG. 5. Moreover, adaptive routing in operation 608 can include using congestion information (or real-time information on network load) to reroute flows in a manner that avoids congesting hotspots. Details regarding the rerouting aspects of adaptive routing are previously described. In operation 608, the routing decisions for each of the flows can be made dynamically at each of the ports on its path in accordance with the disclosed adaptive routing techniques.

Subsequently, at operation 610 a check is performed to determine whether a critical error is encountered on an active link along the transmission path. An encountered error may involve a hardware failure that causes a failed link, or a link that is experiencing such a large numbers of errors and/or congestion that the link is effectively failed (e.g., bi-directional transmission of packets not properly supported, high packet loss). As an example, as a flow traverses the switch fabric, a switch on the transmission path may recognize that it has lost connectivity to another peer switch in the fabric. In some cases, the switch has the capability to provide a measure of the rate and type of errors that occur on a failed link.

In response to encountering the failed link, the process may proceed to operation 612. At operation 612, an error acknowledgement (ErrorAck) can be generated for any of the flows that are actively involved in transmission on the failed link. Thus, the error acknowledgement serves as an indication that the flow has encountered an error, or failed link, at a point along its route on the transmission path. In some cases, generating the error acknowledgement involves replacing sending acknowledgements in accordance with the flow channel operation, with the error acknowledgement. The error acknowledgements can be transmitted, via flow channel operation, upstream along the same route as the flows having active transmissions on the path of the failed link.

Subsequently, at operation 614, the error acknowledgements can be transmitted upstream from the failed link. For example, from the switch that experienced the loss of connectivity, error acknowledgements can be transmitted to all ingress ports (e.g., associated with other switches) that are upstream within the fabric until reaching ingress edge switches. As a result of receiving this error acknowledgement, upstream ingress ports (and switches) have an awareness that the error has been encountered at a failed link downstream. In response, each of the ingress ports can dynamically update the path of any flows that currently include this failed link to avoid this point downstream, as function of "on the fly" routing. In some cases, updating the path for flows involves updating the routing table at the port. For instance, a routing table can be updated for avoidance. That is, any route that currently includes the failed link can be rerouted in a manner that prevents traversing the failed link. Alternatively, the routing table can be updated such that any alternative routes (that do not include the failed link) are preferred. In another example, updating the routing table can include routing restrictions, such as eliminating any routes that includes the failed link as routing options, or removing the failed link as eligible for use in routing minimally (e.g., adaptive routing). Therefore, "on the fly" routing effectively reroutes flows that are potentially directly impacted by the errors encountered on a particular path, working around the failed link in the network. This "on the fly" routing targets the flows that are en-route on a path with the failed link, while other traffic that is not directly impacted by that failed link are continued to flow.

In another embodiment, the dynamically updating the path for flows to avoid the failed link can involves leveraging the congestion avoidance aspects of adaptive routing. As an example, the failed link may be indicated as a detected congested link, which then causes adaptive routing to consider any routes including the failed link (e.g., seen as including congestion), as a less preferred route. Accordingly, other routes that do not include the failed link will be preferred by adaptive routing techniques, in an effort to avoid or minimize congestion.

A capability of the switches disclosed (in addition to flow channels) is congestion. detection. Congestion detection can include measuring a degree of congestion and utilization of ack packets that indicate congestion. For example, local congestion within a switch can be observed through buffer utilization. Buffer utilization can be an indication of the link utilization of that local port. Global congestion can be observed, detecting "hot spots" that the traffic encountered on its path to the destination. Generally, this congestion can be described as either endpoint congestion (e.g., many-to-one communications), or the result of multiple traffic flows being directed through a specific portion of the network, and overloading the resources within that specific area of the network. Regarding flow channel, when a packet arrives at a heavily congested edge egress port an ack (NewCongestionAck) can be generated. The ack can signal to all upstream IFCTs that the flow is experiencing congestion characteristics, in this case as a result of a destination congestion (possible caused by incast communication). In some embodiments, flow channels can be leveraged to adjust traffic based on receiving an ack indicating congestion. As an example, the maximum flow_extent, maximum fabric link flow queue depth (known as the queue_extent), and the maximum flow bandwidth will all be reduced as the NewCongestionAck pass through the IFCT.

Referring back to operation 614, dynamically updating the path for flows to avoid the failed link further changes the routes of any new flows, in addition to the flows that are en-route during transmission. For example, at an upstream ingress port, any new flow at that port can have its routing table updated such that its routes are directed away from (or around) the known failed link downstream. In some cases, updating the routing table for new flows aims to reroute by selectively removing existing route alternatives that includes the failed link, rather than adding new routes (that may potentially violate routing requirements).

Referring back to previous operation 610, no error may be encountered on the transmission path. As a result, process 600 continues to operation 616. At operation 616, since no flows are in danger of encountering a failed link along its current path transmission path, the flows are allowed to continue to be routed through the fabric nominally, in accordance to the disclosed adaptive routing techniques.

By leveraging flow channels in adaptive routing, each flow in a network switch can have its own private queue of packets. This separates flow control for each flow, which further allows separate flow control for each flow. This completely separate flow control enables the network to be lossless. For instance, one flow using a link can be blocked on its path to its final destination without blocking any of the other flows using the same link as the first blocked flow. Unlike traditional packet switched network, congestion in one part of the network will only affect the flows sending packets into the congestion bottleneck. A typical lossless network can cause the buffers before the congestion bottleneck to fill up quickly fill up with the congesting packets. This in turn forces the switch to assert pause or use some other flow control method to prevent the previous switches from sending packets onto the link with the filling buffers. The congesting packets are stopped and all other packets, which may not be heading to the congestion bottleneck, are also stopped, forcing the congestion to spread sideways and increasing the size of the saturation tree.

By implementing flow channels, the load presented on the links before the congestion bottleneck by the congesting flows reduces, allowing other flows that are sharing the earlier links to use more link bandwidth and complete their communications more quickly. Only the packets belonging to flows that are identified as a source of congestion bottleneck are slowed down. Other flows that are not impacted by congestion are not slowed down. These flows will take advantage of the released load previously taken by the congesting flows. Eventually the congestion will clear and the flows heading into the congestion hotspot will complete their communication without dropping any packets.

Figure 7:
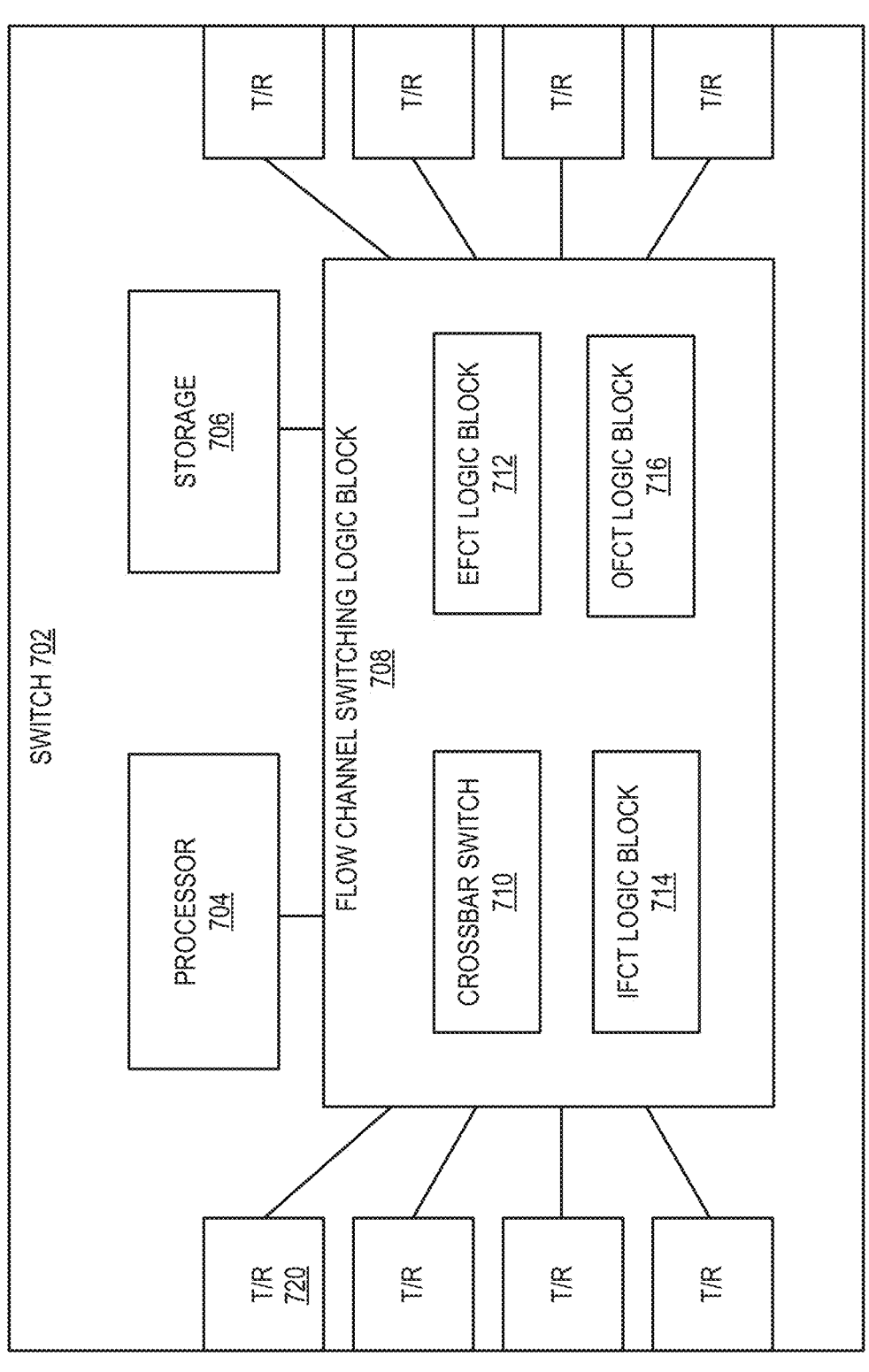
FIG. 7 illustrates an example switch that facilitates flow channels for "on the fly" routing in the presence of errors.

FIG. 7 illustrates an example switch 702 (which may be an embodiment of any one or more of switches 102, 104, 106, 108, and 110) that may be used to create a switch fabric, e.g., switch fabric 100 of FIG. 1. In this example, a switch 702 can include a number of communication ports, such as port 720. Each port can include a transmitter and a receiver. Switch 702 can also include a processor 704, a storage device 706, and a flow channel switching logic block 708. Flow channel switching logic block 708 can be coupled to all the communication ports and can further include a crossbar switch 710, an EFCT logic block 812, an IFCT logic block 714, and an OFCT logic block 716.

Crossbar switch 710 can include one or more crossbar switch chips, which can be configured to forward data packets and control packets (such as ACK packets) among the communication ports. EFCT logic block 812 can process packets received from an edge link and map the received packets to respective flows based on one or more header fields in the packets. In addition, EFCT logic block 712 can assemble FGFC Ethernet frames, which can be communicated to an end host to control the amount of data injected by individual processes or threads. IFCT logic block 714 can include the IFCT, and perform various flow control methods in response to control packets, such as endpoint-congestion-notification ACKs and fabric-link credit-based flow control ACKs. OFCT logic block 716 can include a memory unit that stores the OFCT and communicate with another switch's IFCT logic block to update a packet's flow ID when the packet is forwarded to a next-hop switch.

In one embodiment, switch 702 is an application-specific integrated circuit (ASIC) that can provide 64 network ports that can operate at either 100 Gbps or 200 Gbps for an aggregate throughput of 12.8 Tbps. Each network edge port may be able to support IEEE 802.3 Ethernet, and Optimized-IP based protocols as well as Portals, an enhanced frame format that provides support for higher rates of small messages. Ethernet frames can be bridged based on their L2 address or they can be routed based on their L3 (1Pv4//1Pv6) address. Optimized-IP frames may only have an L3 (1Pv4/1Pv6) header, and are routed. Specialized NIC support can be used for the Portals enhanced frame format, and can map directly onto the fabric format of network 100, e.g., a fabric format that provides certain control and status fields to support a multi-chip fabric when switches/switch chips, such as switches 102, 104, 106, 108, and 110 are connected and communicate with each other. As alluded to above, a congestion control mechanism based on flow channels can be used by such switches, and can also achieve high transmission rates for small packets (e.g., more than 1.2 billion packets per second per port) to accommodate the needs of HPC applications.

Switch 702 can provide system-wide Quality of Service (QOS) classes, along with the ability to control how network bandwidth is allocated to different classes of traffic, and to different classes of applications, where a single privileged application may access more than one class of traffic. Where there is contention for network bandwidth, arbiters select packets to forward based on their traffic class and the credits available to that class. Network can support minimum and maximum bandwidths for each traffic class. If a class does not use its minimum bandwidth, other classes may use the unused bandwidth, but no class can get more than its maximum allocated bandwidth. The ability to manage bandwidth provides the opportunity to dedicate network resources, as well as CPUs and memory bandwidth to a particular application.

In addition to support for QoS classes, switch 702 effectuates flow channel-based congestion control, and can limit the routing flows identified as congested and reduce the number of network hops, e.g., in a network having a dragonfly topology, from five network hops to three. The design of switch 702, described in greater detail below, can reduce network cost and power consumption, and may further facilitate use of innovative adaptive routing algorithms that improve application performance. A fabric created by a plurality of switches, such as a plurality of switches 702 may also be used in constructing Fat-Tree networks, for example when building a storage subsystem for integration with third-party networks and software. Further still, the use of switch 702 enables fine-grain adaptive routing while maintaining ordered packet delivery. In some embodiments, switch 702 may be configured to send the header of a packet from an input port to an output port before the full data payload arrives, thereby allowing output port load metrics to reflect future loads, thereby improving adaptive routing decisions made by switch 202.

Crossbar switch 710 may comprise separate, distributed crossbars routing data/data elements between input and output ports. Switch 802 may have a plurality of transmit/receive ports, e.g., port 720. Parts of switch 702 associated with output functions generally operate on frames within the switch fabric format, and have a fabric header, even, for example, for a frame arriving and leaning on an Ethernet port within a single switch 702.

Figure 8:
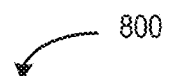
FIG. 8 is an example computing component that may be used to implement various features of embodiments described in the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts.

Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors. The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
establishing a flow channel defining a data path along which transmission of a packets of a flow occurs from an ingress switch to an egress switch;
returning acknowledgements (ACKs) on the flow channel from the egress switch to the ingress switch in response to the transmission of the packets, the ACKs traversing the data path in reverse order back to the ingress switch;
in response to encountering a failed link along the data path based on receipt of an ACK at a link upstream of the failed link, converting the ACK to an error ACK identifying the failed link; and
at one or more ingress ports upstream from the failed link, updating the data path to avoid the failed link, wherein a subsequent packet of the flow traversing the updated data path avoids the failed link.

2. The method of claim 1, wherein the data path comprises the ingress switch, the egress switch, and one or more intermediate switches between the ingress switch and the egress switch.

3. The method of claim 2, wherein the ACKs are generated by the egress switch or the one or more intermediate switches.

4. The method of claim 2, wherein the ACKs release the flow channel at the egress switch, the one or more intermediate switches, and the ingress switch in reverse order when no other packets are sent on the flow.

5. The method of claim 2, wherein state information of the flow is updated at the ingress switch, the egress switch, and the one or more intermediate switches based on information carried by the ACKs, the information comprising downstream data path information.

6. The method of claim 5, wherein the ACK comprise a type field providing the information, the information including information regarding the failed link.

7. The method of claim 5, further comprising updating the information carried by the ACKs prior to being forwarded to a next upstream switch of the data path.

8. The method of claim 7, wherein the state information and forwarding information are stored in flow channel tables associated with the switches of the data path.

9. The method of claim 8, wherein the data path and an amount of data belonging to the path are described in a set of the flow channel tables that are dynamically connected.

10. The method of claim 5, wherein the state information reflects an amount of outstanding, unacknowledged data.

11. The method of claim 1, further comprising, assigning a flow ID to the packets at each switch of the data path, establishing a chain of flow IDs.

12. The method of claim 11, further comprising, distinguishing distinctions between the flow and one or more other flows traveling on a same fabric link based on the chain of flow IDs.

13. The method of claim 1, further comprising:

establishing a plurality of flow channels defining data paths along which transmission of packets of a plurality of flows occur; and at one or more ingress ports upstream from the failed link along the plurality of flow channels, updating the data paths to avoid the failed link, wherein subsequent packets of the plurality of flows traversing the updated data paths avoid the failed link.

14. A switch, comprising:

an application-specific integrated circuit (ASIC) configured to:

establish a flow channel defining a data path along which transmission of packets of a flow occurs, the switch being one switch of the defined data path;

generating acknowledgements (ACKs) on the flow channel in response to the transmission of the packets, and the ACKs traversing along the defined data path in reverse order; and in response to encountering a failed link along the defined data path based on receipt of an ACK at a link upstream of the failed link, converting the ACK to an error ACK identifying the failed link, prompting updating of the defined data path to avoid the failed link at each ingress port upstream from the failed link.

15. The switch of claim 14, wherein state information of the flow is updated at the switch based on information carried by the ACKs, the information comprising downstream data path information.

16. The switch of claim 15, wherein the ACKs comprise a type field providing the information, the information including information regarding the failed link.

17. The switch of claim 15, wherein the ASIC is further configured to update the information carried by the ACKs prior to being forwarded to a next upstream switch of the defined data path.

18. The switch of claim 17, wherein the ASIC is further configured to store the state information and forwarding information in a flow channel table associated with the switch.

19. The switch of claim 15, wherein the state information reflects an amount of outstanding, unacknowledged data.

20. The switch of claim 14, wherein the ASIC is further configured to assign a flow ID to the packets, the flow ID being included as part of a chain of flow IDs assigned at each switch of the defined data path wherein the chain of flow IDs allows for distinctions between the flow and one or more other flows traveling on a same fabric link.

* * * * *